US008493556B2

(12) United States Patent
Li et al.

(10) Patent No.: US 8,493,556 B2
(45) Date of Patent: **\*Jul. 23, 2013**

(54) DISTRIBUTED BRILLOUIN SENSING SYSTEMS AND METHODS USING FEW-MODE SENSING OPTICAL FIBER

(75) Inventors: Ming-Jun Li, Horseheads, NY (US); Shenping Li, Painted Post, NY (US); Xiaobin Wang, Beijing (CN)

(73) Assignee: Corning Incorporated, Corning, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/344,065

(22) Filed: Jan. 5, 2012

(65) Prior Publication Data

US 2012/0274927 A1 Nov. 1, 2012

Related U.S. Application Data

(63) Continuation-in-part of application No. 13/097,201, filed on Apr. 29, 2011.

(51) Int. Cl.
*G01N 21/00* (2006.01)
(52) U.S. Cl.
USPC .......................................................... 356/73.1
(58) Field of Classification Search
USPC ........................................ 356/73.1; 398/9–38
See application file for complete search history.

(56) References Cited

U.S. PATENT DOCUMENTS

| 7,113,659 B2 | 9/2006 | Taverner |
| 7,245,790 B2 | 7/2007 | Brown et al. |
| 7,284,903 B2 | 10/2007 | Hartog |
| 7,355,163 B2 | 4/2008 | Watley et al. |
| 7,480,460 B2 | 1/2009 | Colpitts et al. |
| 7,529,434 B2 | 5/2009 | Taverner et al. |
| 2008/0253428 A1 | 10/2008 | MacDougall et al. |
| 2011/0019179 A1 | 1/2011 | Molin et al. |

FOREIGN PATENT DOCUMENTS

| EP | 0951641 | 4/2002 |
| WO | 2008/056143 | 5/2008 |
| WO | 2010/085605 | 7/2010 |

OTHER PUBLICATIONS

"Brillouin distributed time-domain sensing in optical fibers: state of the art and perspectives"; Thevenaz; Front. Optoelectron. China 2010, 3(1): 13-21.
"Development of a distributed sensing technique using brillouin scattering"; Horiguchi et al; Journal of Lightwave Technology; vol. 13, No. 7, Jul. 1995.

(Continued)

*Primary Examiner* — Tara S Pajoohi Gomez
(74) *Attorney, Agent, or Firm* — Svetlana Z. Short

(57) ABSTRACT

Some embodiments of a distributed Brillouin optical fiber sensing system employs a sensing optical fiber that supports two or more (i.e., few) guided modes. Pump light supported by one of the guided modes is used to form a dynamic Brillouin grating (DBG). Probe light supported by at least one of the other guided modes interacts with the DBG to form reflected probe light that is received and analyzed to determine a Brillouin frequency shift, a phase matching wavelength between probe and pump light, a reflection location, which in turn allows for making a measurement of at least one condition along the sensing optical fiber. Supporting the pump and probe light in different guided modes results in the optical fiber sensing system being able to simultaneously measure temperature and strain and having a higher spatial resolution than sensing systems where the pump light and probe light share a common guided mode.

18 Claims, 20 Drawing Sheets

OTHER PUBLICATIONS

"Distributed sensing using stimulated Brillouin scattering: towards ultimate resolution"; Fellay et al; Reprinted with permission from the 12th International Conference on Optical Fiber Sensors; 1997 OSA Technical Digest Series; vol. 16; Optical Society of America.

"Experimental and theoretical studies on a distributed temperature sensor based on brillouin scattering"; Bao et al; Journal of Lightwave Technology, vol. 13, No. 7, Jul. 1995; 1340-1348.

"Automated system for distributed sensing"; DeMerchant, et al; Department of Civil Engineering; University of New Brunswick, pp. 315-322, Mar. 1998.

"High-resolution brillouin optical time domain analysis based on brillouin dynamic grating"; Song et al; Optics Letters; vol. 35, No. 1, Jan. 1, 2010; p. 52-54.

International Search Report in counterpart application PCT/US12/32952 issued Aug. 3, 2012.

DISTRIBUTED BRILLOUIN SENSING SYSTEMS AND METHODS USING FEW-MODE SENSING OPTICAL FIBER

CROSS-REFERENCE TO RELATED APPLICATIONS

This application is a continuation-in-part of U.S. patent application Ser. No. 13/097,201 filed on Apr. 29, 2011, the content of which is relied upon and incorporated herein by reference in its entirety, and the benefit of priority under 35 U.S.C. §120 is hereby claimed.

FIELD

The disclosure generally relates to sensing systems and methods, and in particular relates to distributed Brillouin sensing systems and methods that use a few-mode sensing optical fiber.

BACKGROUND

Distributed sensors based on Brillouin scattering are attractive for forming optical fiber sensing systems used to measure the structural integrity of buildings, bridges, tunnels, dams and pipelines, as well as ships and airplanes. The most popular Brillouin optical fiber sensing system is Brillouin Optical Time Domain Reflectometry (BOTDR). This technique is very similar to Rayleigh-based OTDR, where spontaneous Brillouin light backscattered from an intense pulse is recorded as a function of time. The frequency distribution of the backscattered signal is measured for each time step to determine a strain or a temperature change at each location. Like a conventional OTDR, a BOTDR requires access to a single fiber end only, which is convenient for many applications. However, the spatial resolution of BOTDR is practically limited to 1 m.

Another optical fiber sensing system utilizes Brillouin Optical Time Domain Analysis (BOTDA). This technique takes advantage of the Stimulated Brillouin Scattering (SBS) based on a pump-probe technique wherein an intense pump pulse interacts locally during its propagation with a weak counter-propagated continuous-wave (CW) probe. The gain experienced by the probe at each location can be analyzed by recording the probe amplitude in the time domain. The frequency difference between the pump and the probe is scanned step-by-step, and the local amplification can be retrieved for a given pump-probe frequency difference. The local gain spectrum can then be reconstructed by analyzing the gain at a given location as a function of frequency. BOTDA requires access to both optical fiber ends since the pump pulse and CW probe must counter-propagate in the sensing fiber, which is a limitation in some situations. BOTDA is subject to the similar spatial resolution limitation as BOTDR, i.e., about 1 m, because of 1) the tradeoff between spatial resolution and sensing sensitivity, and 2) the significant broadening and lowering of the Brillouin gain spectrum as the pulse width is reduced to the values comparable with the acoustic relaxation time (~10 ns). In addition, one problem with conventional BOTDR or BOTDA systems in the field is the sensitivity of Brillouin frequency shift to both strain and temperature. This effect leads to ambiguity in the measurement, as one does not know whether the observed Brillouin frequency shift is caused by the change of strain or temperature.

To improve the spatial resolution, the use of a Brillouin Dynamic Grating (BDG) formed in a polarization-maintaining single-mode optical fiber has been proposed. In this approach, an acoustic wave is generated in one polarization by a pump and is used to reflect an orthogonally polarized probe at a different optical frequency from the pump. An experiment result was reported wherein a distributed strain is measured with a 10 cm spatial resolution in a 105 m of polarization-maintaining single-mode optical fiber. However, polarization-maintaining single-mode optical fibers typically have higher attenuation and are more expensive than standard optical fibers. In addition, the sensing schemes required for a polarization-maintaining optical single-mode fiber system require polarization-maintaining components that add additional cost and complexity to the sensing systems. Furthermore, it is difficult to maintain a given polarization over a long fiber (i.e., a few km or longer), which limits the sensor system length.

There is therefore a need for low-cost optical fiber sensing systems with improved spatial resolution and simultaneous measurement temperature and strain.

SUMMARY

An embodiment of the disclosure is a distributed Brillouin optical fiber sensing system. The system includes a sensing optical fiber configured to support a fundamental guided mode and at least one higher-order guided mode. The system includes a pump light source configured to introduce pump light into one of the guided modes to define a pump light guided mode. The pump light forms a Brillouin dynamic grating (BDG) within the sensing optical fiber. The system also has a probe light source that is configured to introduce input probe light into one or more of the guided modes other than the pump light guided mode to create reflected probe light from the BDG. The reflected probe light and the input probe light are shifted in frequency relative to each other by a Brillouin frequency shift. The system also includes a receiver optically coupled to the sensing optical fiber. The receiver is configured to detect the reflected probe light to determine a Brillouin frequency shift and the reflection location, and in an example is or includes an optical spectral analyzer.

Another embodiment of the disclosure is a distributed Brillouin optical fiber sensing system. The system has a sensing optical fiber configured to support at least first and second guided modes. In an example, the sensing optical fiber is not polarization-maintaining. The system also includes a first pump light source optically coupled to the sensing optical fiber. The first pump light source is configured to generate first pump light that travels in the sensing optical fiber in the first guided mode and forms a BDG that contains information of a local Brillouin frequency of the sensing optical fiber. The system also includes a probe light source optically coupled to the sensing optical fiber. The probe light source is configured to generate pulsed probe light that travels in the sensing optical fiber in the second guided mode. The pulsed probe light has a wavelength selected so that at least a portion of the pulsed probe light reflects from the Brillouin dynamic grating and includes information about the local Brillouin frequency. The system also has a receiver optically coupled to the sensing optical fiber and configured to receive the reflected probe light and to determine the local Brillouin frequency and the reflection location, and thus at least one condition along the sensing optical fiber.

Another embodiment of the invention is a method of sensing at least one condition along a sensing optical fiber. The method includes sending pump light down the optical fiber in only a first guided mode supported by the sensing optical fiber to create a BDG. The method also includes sending pulsed probe light of a first frequency down the optical fiber in at least a second guided mode supported by the sensing optical fiber to obtain reflected probe light from the Brillouin dynamic grating. The reflected probe light has a second frequency shifted relative to the first frequency by a frequency shift and has a reflection location. The method further includes analyzing the reflected probe light to determine its reflection location and its shifted frequency to determine the at least one condition. In an example, the at least one condition is at least one of temperature and strain as a function of location (distance) along the sensing optical fiber.

According to at least some embodiments a distributed Brillouin optical fiber sensing system comprises: (a) a sensing optical fiber configured to support a fundamental guided mode and at least one higher-order guided mode; (b) a pump light source configured to introduce pump light into one of the guided modes to define a pump light guided mode, the pump light forming a Brillouin dynamic grating (BDG); (c) a probe light source configured to introduce input probe light into one or more of the guided modes other than the pump light guided mode to create reflected probe light from the BDG, with the reflected and input probe light shifted in frequency by a Brillouin frequency shift; and (d) a receiver optically coupled to the sensing optical fiber and configured to detect the reflected probe light to determine a Brillouin frequency shift, a reflection location of the probe light, and the wavelength separation between the probe and pump lights, said receiver being configured to determine simultaneously temperature and strain in the sensing optical fiber as a function of distance along the sensing optical fiber.

According to at least some embodiments a sensing optical fiber comprises: a few-moded core with a core radius of 4 $\mu m \leq r \leq 10$ $\mu m$ and F factor ($\mu m^2$) is 76 $\mu m^2$ to 306 $\mu m^2$. Preferably, the sensing fiber has a core $\Delta$ between 0.25% to 1%, and the core radius r is between 4 to 10 microns, the F-factor 100 $\mu m^2 \leq$ F-factor $\leq 200$ $\mu m^2$ and effective area Aeff of 50 $\mu m^2 \leq$ Aeff $\leq 150$ $\mu m^2$. In some embodiments the core radius is 5 $\mu m \leq r \leq 7$ $\mu m$ and the core $\Delta$ is between 0.4% to 0.7%.

According to at least some embodiments a distributed Brillouin optical fiber sensing system comprises: (i) a sensing optical fiber configured to support a fundamental guided mode and at least one higher-order guided mode, said sensing fiber having core radius of 4 $\mu m \geq ro \geq 10$ $\mu m$ and F factor ($\mu m^2$) of 76 $\mu m^2$ to 306 $\mu m^2$; (ii) a pump light source configured to introduce pump light into one of the guided modes to define a pump light guided mode, the pump light forming a Brillouin dynamic grating (BDG); and (iii) a probe light source configured to introduce input probe light into one or more of the guided modes other than the pump light guided mode to create reflected probe light from the BDG, with the reflected and input probe light shifted in frequency by a Brillouin wavelength shift.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference is now be made in detail to embodiments of the disclosure, examples of which are illustrated in the accompanying drawings. Whenever possible, like reference numbers are used to refer to like components or parts. Cartesian coordinates are shown in some of the Figures by way of reference.

In the discussion below and in the claims, reference to a "first guided mode" and a "second guided mode" does not necessarily refer to the lowest order and first-order guided modes respectively, but rather is more generally intended to refer to different ones of the available guided modes.

Also in the discussion below, the following definitions and terminology as commonly used in the art are employed.

Refractive index profile: the refractive index profile is the relationship between the relative refractive index percent (Δ%) and the optical fiber radius r (as measured from the centerline of the optical fiber) over a selected segment of the fiber.

Relative refractive index percent Δ(%) or Δ: the term Δ represents a relative measure of refractive index defined by the equation: $\Delta(\%)=100\times(n_i^2-n_c^2)/2n_i^2$ where $n_i$ is the maximum refractive index of the index profile segment denoted as i, and $n_c$, the reference refractive index. Every point in the segment has an associated relative refractive index measured relative to the reference refractive index.

Figure 1A:
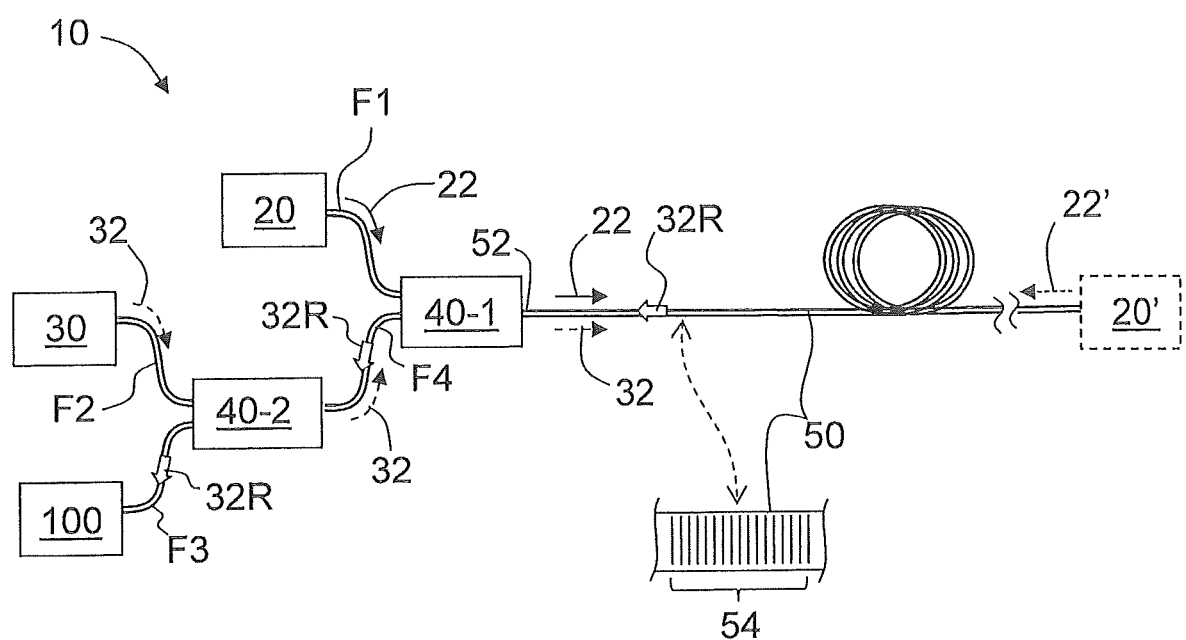
FIG. 1A is a schematic diagram of an example embodiment of a distributed Brillouin sensing system according to the disclosure.

FIG. 1A is a schematic diagram of an example embodiment of a distributed Brillouin sensing system ("system") 10 according to the disclosure. System 10 includes a pump light source 20 that generates pump light 22 of wavelength λ1 (frequency v1) and a probe light source 30 that generates probe light 32 of tunable wavelength λ2 (tunable frequency v2). System 10 also includes a "few guided mode" sensing optical fiber 50 that supports at least first and second guided modes. In an example, sensing optical fiber 50 is non-polarization-maintaining Sensing optical fiber 50 has an input/output end 52. Pump light source 20 and probe light source 30 are optically coupled to sensing optical fiber 50 at input/output end 52. System 10 also includes a receiver 100 optically coupled to input/output end 52. In an example, receiver 100 includes a digital signal processor operably connected to a balanced coherent detector formed by a 50:50 optical coupler and a balanced photodetector. An example receiver 100 is discussed in greater detail below.

In an example, the optical coupling to sensing optical fiber input/output end 52 of pump and probe light sources 20 and 30 and receiver 100 is accomplished using different sections of multimode optical fiber F and multimode 1×2 50:50 fiber-optic couplers 40. In an embodiment, the multimode optical fiber F and the multimode couplers 40 are made of the same few mode fiber (FMF) as the sensing fiber to minimize the insertion loss. Thus, in one embodiment, pump light source 20 is optically coupled to a first optical coupler 40-1 via a first optical fiber section F1, while probe light source 30 and receiver 100 are respectively optically coupled to a second optical coupler 40-2 via respective optical fiber sections F2 and F3. Second optical coupler 40-2 is optically coupled to first optical coupler 40-1 via a fourth optical fiber section F4. First fiber optic coupler 40-1 is also optically coupled to sensing optical fiber input/output end 52.

Figure 2A:
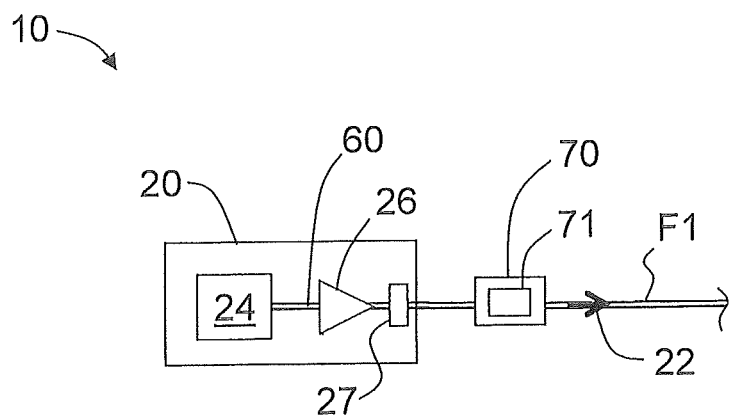
FIG. 2A and FIG. 2B are schematic diagrams that illustrate example embodiments of the pump light source (FIG. 2A) and the probe light source (FIG. 2B)

In an example, pump light source 20 comprises a narrow-linewidth laser. FIG. 2A is a schematic diagram that illustrates an example embodiment of pump light source 20 that includes a fiber laser 24 that employs a suitable configured single-mode fiber 60 and a first optical fiber amplifier 26. The wavelength λ1 of pump light 22 can be in the range of 500 to 1600 nm. In various embodiments, the pump light wavelength is greater than 800 nm, is greater than 1000 nm, is greater than 1300 nm, and is in the wavelength range of 1500 nm to 1600 nm, where optical fiber loss is generally at a minimum. In an example, pump light source 20 includes a tunable filter 27 to filter the spontaneous emission outside the pump wavelength bandwidth.

FIG. 2A illustrates an example where single-mode fiber 60 is optically coupled to multimode optical fiber section F1 using a coupling member 70. In an example, the coupling member 70 is a simple splice to excite the fundamental mode in optical fiber F1. In another example, coupling member 70 contains a mode-selection or "mode converter" 71 configured to launch a specific mode in optical fiber section F1. Mode converter 71 may include a free-space based element, such as phase plate, or a fiber-based element, such as long-period fiber grating, e.g., a tilted fiber Bragg grating.

Different types of lasers can be used as pump lasers for pump light source 20, including semiconductor lasers and fiber lasers, as shown in FIG. 2A. In an example, pump light source 20 comprises a CW source, i.e., generates CW pump light 22. In another example, pump light source 20 generates pulsed pump light 22. If a pulsed pump light source 20 is used, then in various embodiments the pulse width is greater than 10 ns, greater than 100 ns, and greater than 1000 ns.

Figure 2B:
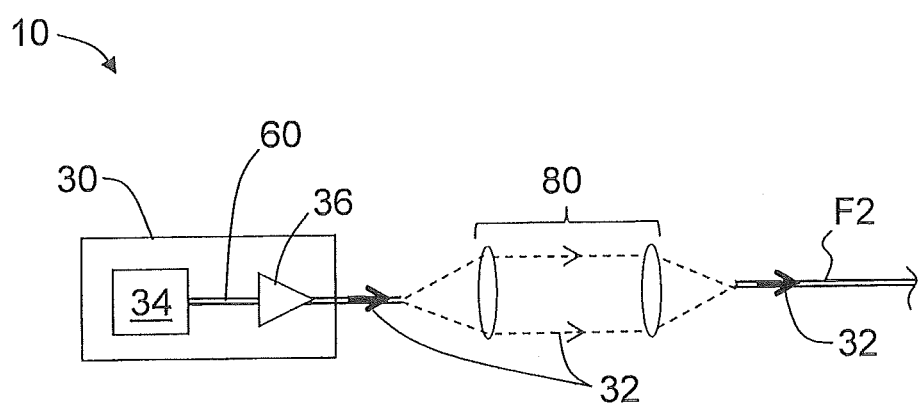

In an example, probe light source 30 comprises a narrow-linewidth tunable laser. FIG. 2B is similar to FIG. 2A and illustrates an example embodiment of probe light source 30 that includes a tunable fiber laser 34 based on a suitably configured single-mode optical fiber 60, and a first optical fiber amplifier 36. In an example, probe light source 30 is optically coupled to a multimode optical fiber section F2 using a free-space optical connection, e.g., via a light-coupling optical system 80. This configuration allows for a select guided mode of sensing optical fiber 50 to be used to support probe light 32. In another example, a long-period grating (e.g., a tilted fiber Bragg grating) based optical mode converter is used to convert the fundamental mode to a selected higher order mode. Probe light 32 can be referred to as "input probe light" to distinguish from reflected probe light 32R.

Figure 1B:
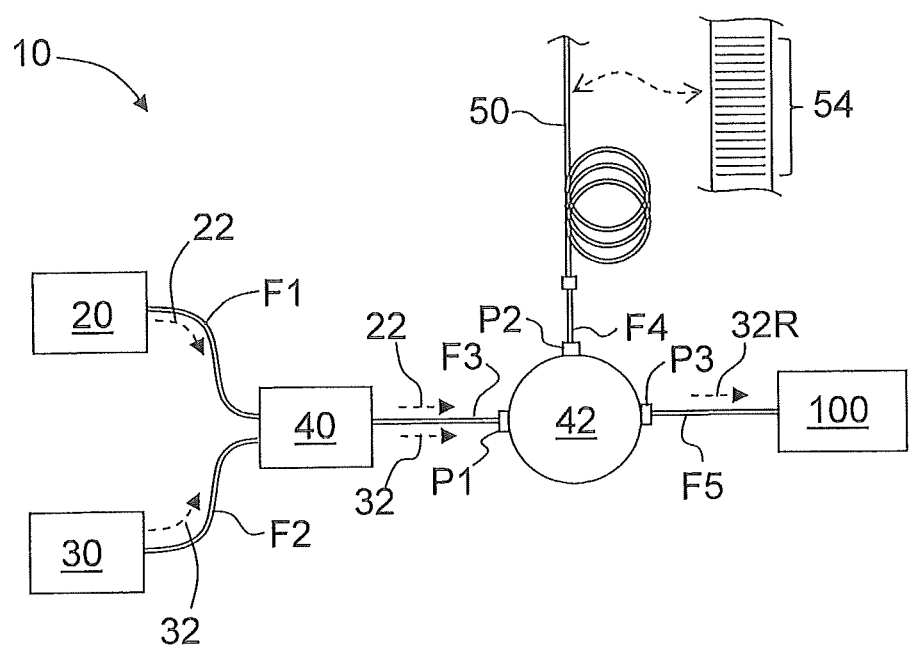
FIG. 1B is a schematic diagram of another example embodiment of a distributed Brillouin sensing system according to the disclosure.

FIG. 1B is similar to FIG. 1A and illustrates another example embodiment of system 10. In System 10 of FIG. 1B, pump and probe light sources 20 and 30 are respectively optically coupled to an optical coupler 40 via fiber sections F1 and F2. Optical coupler 40 in turn is optically coupled via optical fiber section F3 to a port P1 of an optical circulator 42 having three ports P1, P2 and P3. An optical fiber section F4 optically connects port P2 to input/output end 52 of sensing optical fiber 50. An optical fiber section F5 optically connects port P3 to receiver 100. This configuration of system 10 allows pump light 22 and probe light 32 to be combined at optical coupler 40 and then directed to sensing optical fiber 50 via optical fiber sections F3 and F4 via circulator 42. The reflected probe light 32R is then directed from the input/output end 52 of sensing optical fiber 50 to receiver 100 via optical fiber sections F4 and F5 via circulator 42.

Figure 3A:
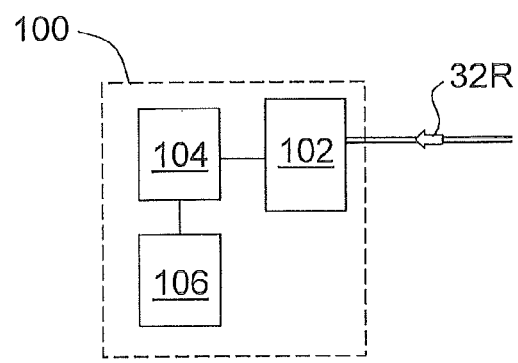
FIG. 3A is a schematic diagram of an example receiver for the system of FIG. 1.

With reference again to FIG. 1A and FIG. 1B, and also to FIG. 3A, in an example embodiment receiver 100 includes a multi-frequency (multi-wavelength) photodetector unit 102 operably coupled to a processor unit ("processor") 104. Receiver 100 also includes a memory unit ("memory") 106. In an example embodiment, receiver 100 comprises an optical spectral analyzer.

Figure 3B:
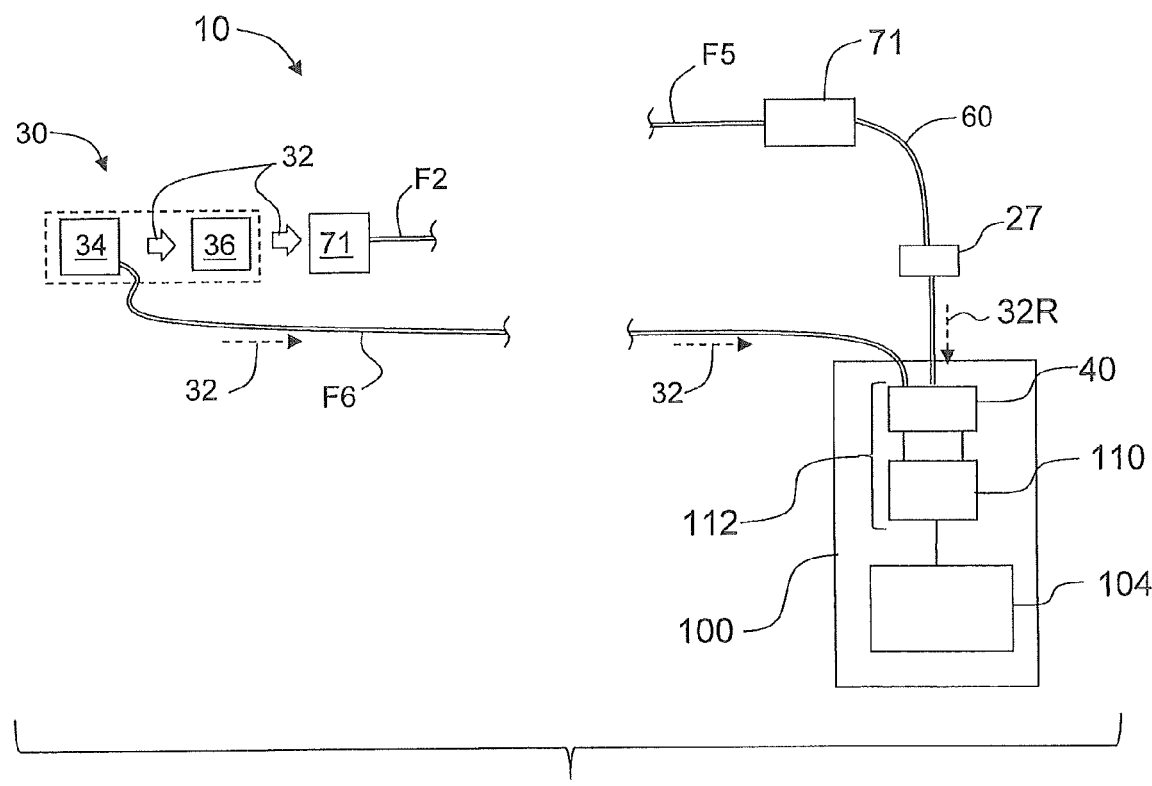
FIG. 3B is a schematic diagram of example probe light source and receiver portions of the system configuration illustrated in FIG. 1B.

FIG. 3B is a close-up view of an example receiver portion and an example probe light source portion of system 10. Receiver 100 is shown as including processor 104 configured as a digital signal processor, and also includes a balanced coherent detector 112 formed by a 50:50 optical coupler 40 and a balanced photodetector 110. The optical coupler 40 is optically connected to single-mode optical fiber section 60 that includes a tunable filter 27 and is optically connected to an optical fiber section F6 that is optically coupled to tunable laser 34 in probe light source 30. This configuration defines a local oscillator to generate the reference light (i.e., a portion of probe light 32) for balanced coherent detector 112.

Probe light source 30 is shown by way of example to include an optical modulator (which inserted between the tunable laser 34 and the optical amplifier, it is not shown in FIG. 2B) that serves to optically modulate CW probe light 32 from CW tunable laser 34 to generate pulsed probe light prior to the probe light being coupled into optical fiber section F2 via a mode converter 71, which serves to introduce a select mode into the optical fiber section F2.

Mode converter 71 residing between (multimode) optical fiber section F5 and single-mode optical fiber section 60 serves to convert reflected probe light 32R from the LP11 guided mode into the LP01 guided mode if the reflected probe light is in the LP11 guided mode in sensing optical fiber 50. This mode converter is not needed if the probe light is already in the LP01 guide mode in sensing optical fiber 50. The narrow-bandwidth filter 27 is used to pass only reflected probe light 32R and to filter out all other reflected light.

In the general operation of system 10 as shown in FIG. 1A, pump light 22 generated by pump light source 20 travels through first optical fiber section F1 to first optical coupler 40-1 and into sensing optical fiber 50 at input/output end 52. Pump light 22 then travels within sensing optical fiber 50 in only one of the guided modes.

Figure 4A:
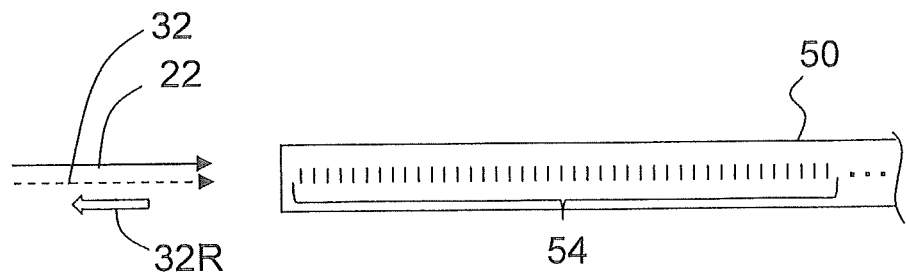
FIG. 4A is a schematic diagram of the input/output end of the sensing optical fiber, illustrating an example configuration for the pump light, the probe light, the reflected probe light and the BDG formed in the sensing optical via SBS of the pump light.

With reference now also to FIG. 4A, when the power of pump light 22 reaches the stimulated Brillouin scattering (SBS) threshold, a Brillouin dynamic grating (BDG) 54 and a Stokes (SBS) wave (not shown) are generated in sensing optical fiber 50. The frequency of the SBS wave is down-shifted from that of the pump light frequency $v_1$. The frequency difference between the pump light and SBS wave is called the Brillouin frequency shift $V_B$, which depends on properties of sensing optical fiber 50 and the optical and acoustic guided modes.

If pump light 22 is transmitted in sensing optical fiber 50 in a guided mode i and the exited acoustic wave is in acoustic guided mode m, the Brillouin frequency shift is given by $$v_B = \frac{2n_i V_m}{\lambda_1} \quad (1)$$

and the corresponding wavelength shift is:

$$\Delta\lambda_B = -v_B \frac{\lambda_1^2}{c} \quad (1a)$$

where $\lambda_1$ is the optical wavelength of the pump, $n_i$ is the effective refractive index of the optical guided mode of order i, and $V_m$ is the effective acoustic velocity of the acoustic guided mode of order m. If short-pulse probe light 32 of frequency $v_2$ is sent though guided mode j (i.e., a guided mode different than that of the pump light 22), a signal of frequency $v_2-v_B$ is reflected by BDG 54 if the phase-matching conditions are satisfied, i.e., if the frequency change between the probe and the pump is:

$$\Delta v = \frac{\Delta n_{ij}}{n_i} v_1 \quad (2)$$

and the corresponding wavelength shift is:

$$\Delta\lambda = -\Delta v \frac{\lambda_1^2}{c} \quad (2a)$$

where $\Delta n_{ij}=n_i-n_j$ is the difference in effective index between optical (guided) guided modes i and j.

Figure 4B:
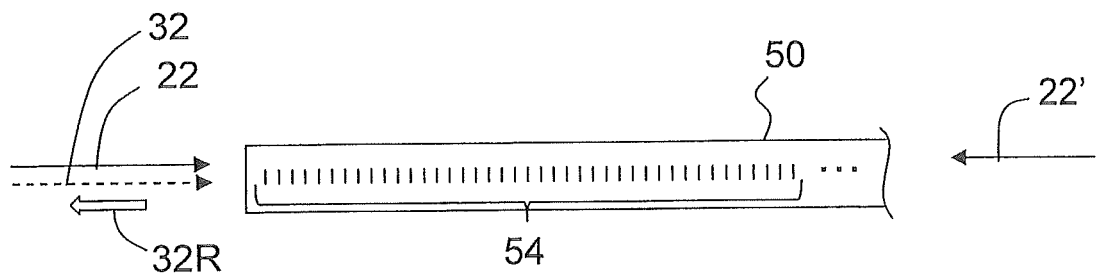
FIG. 4B is similar to FIG. 4A and further illustrates an example configuration where first and second pump light traveling in opposite directions in the sensing optical fiber is employed.

FIG. 4B is similar to FIG. 4A and schematically illustrates another embodiment system 10 that utilizes a second pump light source 20', shown in phantom in FIG. 1A. In this embodiment, a narrow-linewidth pump light 22 at frequency $v_1$ (wavelength $\lambda_1$) from pump light source 20 and narrow-linewidth pump light 22' at frequency $v'_1$ (wavelength $\lambda'_1$) from pump light source 20' are counter-propagated in sensing optical fiber 50 to generate BDG 54. The pump light wavelengths can be in the range of 500 nm to 1600 nm. In various embodiments, the wavelength is greater than 800 nm, greater than 1000 nm, greater than 1300 nm, and in the wavelength range of 1500 nm to 1600 nm, where fiber loss is generally at a minimum.

When the frequency difference $(v_1-v'_1)$ matches the Brillouin frequency shift $v_B$, BDG 54 is generated in sensing optical fiber 50. As in the single-pump-light embodiment, the Brillouin frequency shift $v_B$ depends on the optical fiber properties of sensing optical fiber 50 and the optical and acoustic guided modes. If pump light 22 and pump light 22' are transmitted though an optical guided mode i and the exited acoustic wave is in acoustic guided mode m, the Brillouin frequency shift $v_B$ and the corresponding wavelength shift are given by Equations 1 and 1a, above.

If probe light 32 of frequency $v_2$ is sent through an optical guided mode j propagating in the same direction as pump light 22, a signal of $v_2-v_B$ is reflected by BDG 54 if the phase-matching conditions are satisfied, i.e., if the frequency change between the probe light 32 and the pump light 22 satisfies Equation 2, or the wavelength change between the probe light 32 and pump light 22 satisfies Equation 2a.

In both embodiments, a stable BDG 54 can be formed by a narrowband Brillouin gain (also a narrowband BDG), which can be localized and scanned along sensing optical fiber 50 in the time domain by a broadband, short-pulse probe light 32 having a nanosecond pulse width and supported by a different guided mode than the pump light 22.

It is noted here that the embodiments of system 10 as illustrated in FIG. 1A and FIG. 1B are exemplary embodiments that illustrate the general principles of operation of the system, and that other embodiments that achieve the same functionality as the illustrated embodiments can be configured.

Pump Light and Probe Light Supported by Different Guided Modes

Figure 5A:
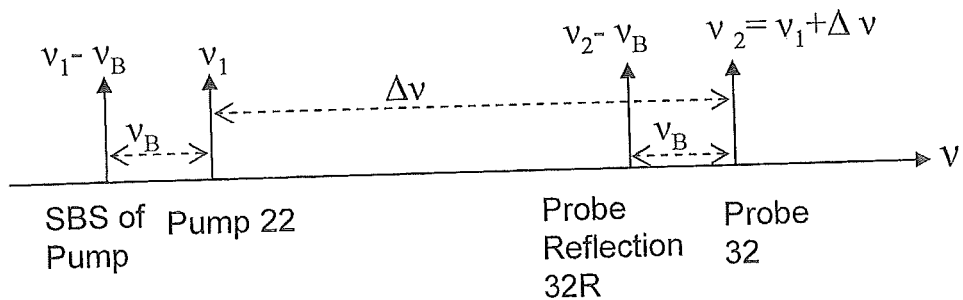
FIG. 5A is a frequency spectrum that shows the relative frequencies involved in the sensing process when the pump light is supported by a guided mode having a lower order than the guided mode for the probe light.

An embodiment of the disclosure is that pump light 22 travels in a different guided mode than probe light 32. In one example, pump light 22 is supported by a guided mode of lower order than that of probe light 32, and this guided mode can be called the pump light guided mode. FIG. 5A is a frequency spectrum that shows the relative frequencies involved in the sensing process when pump light 22 is supported by a guided mode having a lower order than the guided mode for the probe light 32.

Figure 5B:
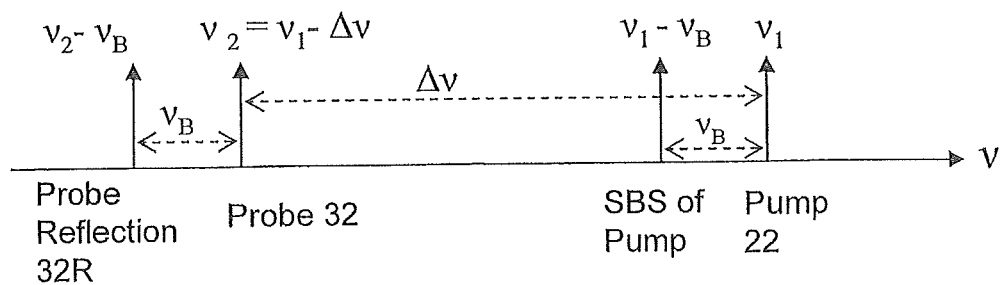
FIG. 5B is similar to FIG. 5A and shows the relative frequencies involved in the sensing process when the pump light is supported by a guided mode having a higher order than the guided mode for the probe light.

In another example, pump light 22 is supported by a guided mode of higher order than that of probe light 32. FIG. 5B is similar to FIG. 5A and shows the relative frequencies involved in the sensing process when the pump light 22 is supported by a guided mode having a higher order than the guided mode for the probe light.

In an example, pump light 22 is supported by a single guided mode, and probe light 32 is supported by multiple other guided modes besides the pump light guided mode.

Simultaneous Measurement of Strain and Temperature

BDG 54 is temperature and strain dependent as a result of the thermal expansion and deformation experienced by sensing optical fiber 50. Thus, the peak frequency change of the reflected probe light 32R (or the change of Brillouin frequency shift) changes with temperature variation ($\delta T$) and strain variation ($\delta \epsilon$), namely:

$$\delta v_B = K_v^\epsilon \delta\epsilon + K_v^T \delta T \qquad (3)$$

where $K_v^T$ is the temperature coefficient, T is the temperature in °C., $K_v^\epsilon$ is the strain coefficient, and $\epsilon$ is the strain.

Because effective refractive index difference between the two fiber modes of few-mode fiber (FMF) can change with strain and temperature, the wavelength difference between pump and probe is relative to strain and temperature too. The change of the wavelength difference between pump and probe ($\Delta\lambda = \lambda_1 - \lambda_2$) (which is also referred to herein as wavelength separation between pump and probe lights) with strain variation ($\delta\epsilon$) and temperature variation ($\delta T$) can be expressed as $$\delta(\Delta\lambda) = K_\lambda^\epsilon \delta\epsilon + K_\lambda^T \delta T \qquad (4)$$

where $K_\lambda^\epsilon$ and $K_\lambda^T$ are the strain and temperature coefficients for the wavelength difference between pump and probe. By solving equations (3) and (4), the strain variation and temperature variation are given by $$\begin{bmatrix} \delta\epsilon \\ \delta T \end{bmatrix} = \frac{1}{K_\lambda^\epsilon K_v^T - K_\lambda^T K_v^\epsilon} \begin{bmatrix} K_v^T & -K_\lambda^T \\ -K_v^\epsilon & K_\lambda^\epsilon \end{bmatrix} \begin{bmatrix} \delta(\Delta\lambda) \\ \delta v_B \end{bmatrix} \qquad (4a)$$

If $K_\lambda^\epsilon K_v^T \neq K_\lambda^T K_v^\epsilon$, then a solution exists for the matrix equation (4a). Thus, simultaneous distributed strain and temperature measurement can be achieved.

Therefore, temperature and strain at different locations along sensing optical fiber 50 can be evaluated using BDG 54 by determining the frequency difference between probe light 32 and the reflected probe light 32R, or measuring the wavelength separation between probe and pump. Simultaneous temperature and strain measurement at different locations along sensing optical fiber 50 can be evaluated simultaneous using BDG 54 by determining the frequency difference between probe light 32 and the reflected probe light 32R, and measuring the wavelength separation between probe and pump. Because of the narrow spectral bandwidth of BDG 54, high-resolution sensing can be achieved. Meanwhile, since probe light 32 can have a relatively short pulse width, a high spatial resolution is obtained.

Spatial Resolution

The distance Z from input/output end 52 of sensing optical fiber 50 to the position where probe light 32 is reflected is given by:

$$Z = \frac{ct}{2n_g} \qquad (5)$$

where t is the time between launching the probe light 32 and receiving the reflected probe light 32R, $n_g$ is the group index of the guided mode of sensing optical fiber 50 into which the probe light 32 is launched, and c is the light speed in vacuum.

The spatial resolution $\Delta Z$ is determined by the probe light pulse width $\tau$:

$$\Delta Z = \frac{c}{2n_g} \tau \qquad (6)$$

A probe light pulse width of $\tau = 100$ ns corresponds to a spatial resolution of $\Delta Z = 10$ m. To get a spatial resolution of less than 1 m, the probe light pulse width $\tau$ should be less than 10 ns. In various embodiments, the probe light pulse width $\tau$ is less than 5 ns and is less than 1 ns. In various embodiments, the probe light pulse width is between 0.1 ns to 5 ns and is between 0.1 ns to 1 ns.

In a second embodiment that employs counter-propagating pump light 22 and 22', the two pump light beams comprise short pump-light pulses selected to generate a stable BDG 54 having a broadband Brillouin gain (i.e., a broadband BDG 54) at the place where two short counter-propagating pump pulses overlap in the time domain.

The distance of this location from input/output end 52 of sensing optical fiber 50 is:

$$Z = \frac{1}{2}\left[L + \frac{c\Delta t}{n_g}\right] \qquad (7)$$

where $\Delta t$ is the time delay between launching the pump-light pulses 22 and 22'. The spatial resolution $\Delta Z$ is determined by the pulse width $\tau_s$ of the longer pump pulse:

$$\Delta Z = \frac{c}{2n_g}\tau_s \quad (8)$$

Probe light 32 with a narrow spectral bandwidth is used to determine temperature and strain at different locations. The measured spectrum of reflected probe light 32 is the convolution of the probe light spectrum and the BDG reflection spectrum. This allows narrow-linewidth probe light 32 to be used to obtain a narrow spectral width of the measured spectrum reflected probe light 32R, which enables a relatively high degree of measurement sensitivity of temperature or strain. Therefore, a high spatial resolution $\Delta Z$ and a high degree of measurement sensitivity can be obtained simultaneously using the systems and methods disclosed herein.

In practice, the spatial resolution $\Delta Z$ is a function of the sensing distance Z (i.e., the distance from input/output end 52 of sensing optical fiber 50). Table 1 below lists example sensing distances Z along with the corresponding spatial resolution $\Delta Z$ that can be obtained using the systems and methods described herein.

Evolution of Probe Power and Reflected Probe Power

TABLE 1

Sensing distance Z and spatial resolution $\Delta Z$

| Z (km) | $\Delta Z$ (mm) |
|---|---|
| 25 | 30 |
| 10 | 15 |
| 1 | 5 |

The evolution of the optical power of the pump light 22 and reflected probe light 32R can be obtained by solving the nonlinear Maxwell equations. The results show that the power changes are related to design parameters of sensing optical fiber 50 through a factor F, which is defined by:

$$F = \sqrt{\frac{A_{eff}^{pp} \cdot A_{eff}^{ss}}{\overline{I}_u^{pp} \cdot \overline{I}_u^{ss}}} \quad (9)$$

where $\overline{I}_u^{pp}$ and $\overline{I}_u^{ss}$ are the overlap integrals defined by $$\overline{I}_u^{pp} = \frac{\left(\int\int E_0\rho_u^* E_0^* r dr d\theta\right)^2}{\int\int(E_0 E_0^*)^2 r dr d\theta \cdot \int\int \rho_u \rho_u^* r dr d\theta} \quad (10)$$

$$\overline{I}_u^{ss} = \frac{\left(\int\int E_s\rho_u E_s^* r dr d\theta\right)^2}{\int\int(E_s E_s^*)^2 r dr d\theta \cdot \int\int \rho_u \rho_u^* r dr d\theta} \quad (10a)$$

$A_{eff}^{pp}$ and $A_{eff}^{ss}$ are the optical effective areas for pumps and probe/probe $$A_{eff}^{pp} = \frac{\left(\int\int E_0 E_0^* r dr d\theta\right)^2}{\int\int(E_0 E_0^*)^2 r dr d\theta} \quad (11)$$

$$A_{eff}^{ss} = \frac{\left(\int\int E_s E_s^* r dr d\theta\right)^2}{\int\int(E_s E_s^*)^2 r dr d\theta} \quad (11a)$$

In the above equations, $E_0$ and $E_S$ are the electrical fields of the pump light 22 and probe light 32, respectively, $\rho_u$ is the acoustic field generated by the pump light, and the symbol * denotes the complex conjugate of the fields. The factor F shows how the fibers design impacts the power propagation of probe light 32 and reflected probe light 32R, and can be used to optimize the design of sensing optical fiber 50 for a particular sensing application. Generally speaking, a smaller value of F means more effective interactions between BDG 54, pump light 22 and probe light 32.

Example Designs for Sensing Optical Fiber

Figure 6:
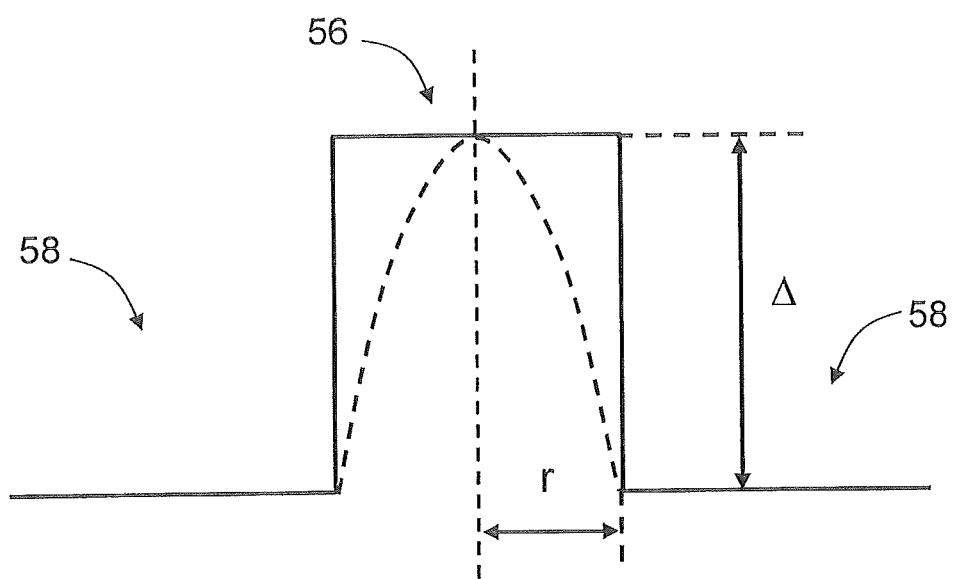
FIG. 6 is a schematic diagram of an example refractive index profile for the sensing optical fiber.

In an example, sensing optical fiber 50 is configured to support two or more guided modes by increasing the cutoff wavelengths of the higher-order guided modes. FIG. 6 is a schematic diagram of example refractive index profiles for sensing optical fiber 50. Sensing optical fiber 50 includes a core 56 and a cladding 58. The core 56 can be defined by a step index profile, by a graded index profile, or other more complicated profiles. A desired number of guided modes can be supported by the core 56 with a properly chosen value for $\Delta$ and a radius r of the core. FIG. 6 illustrates both a step-index core profile (solid line) and a graded-index core profile (dashed line).

Tables 2 through Table 4 below set forth a total of eight example designs for sensing optical fiber 50. All the Examples have step-index profiles. The core $\Delta$ of the sensing fiber 50 is preferably 0.25% to 1% (more preferably $0.4\% \leq \Delta \leq 0.7\%$), and the core radius r is preferably 4 $\mu m \leq r \leq 10$ $\mu m$, (preferably 5 $\mu m \leq r \leq 7$ $\mu m$). Preferably, the F-factor of the sensing 76 $\mu m^2 <$F-factor$< 312$ $\mu m^2$, for example 100 $\mu m^2 \leq$F-factor$\leq 200$ $\mu m^2$. Preferably the effective area Aeff of the sensing fiber is 50 $\mu m^2 \leq$Aeffv 150 $\mu m^2$, for example 50 $\mu m <$Aeff$< 100$ $\mu m^2$.

Examples 1 through 5 have two guided modes, LP01 and LP11. The overlap between the fundamental optical guided mode and the fundamental acoustic guided mode is about 0.99, and the overlap between the LP11 guided mode and the fundamental acoustic guided mode is about 0.4 for all the five examples. However, a higher core $\Delta$ allows for smaller core radii r. As a result, the effective areas for the LP01 and LP11 guided modes become smaller, which results in smaller F factors and better system efficiency.

Examples 6-8 have 4 or 5 guided modes. If the LP01 guided mode is used to guide pump light 22, then probe light 32 will be guided by the LP11, LP02, or LP21 guided modes, a combination thereof. If a combination of the higher-order guided modes is used to carry probe light 32, the reflected probe light 32R will have multiple peaks at different wavelengths. Also as shown in Examples 6 and 8, a higher-order guided mode, e.g. LP11, can be used to carry pump light 22. In this case, the fundamental guided mode LP01 or another higher order guided mode can be used to carry probe light 32. Again, Examples 6-8 show higher values for $\Delta$ that enable a smaller F factor and thus higher system efficiency.

TABLE 2

Examples 1 through 5

| Example # | 1 | 2 | 3 | 4 | 5 |
|---|---|---|---|---|---|
| $\Delta_0$ (%) | 0.25 | 0.34 | 0.5 | 0.75 | 1.00 |
| $r_0$ (μm) | 8.5 | 7.2 | 6 | 5 | 4.00 |
| # guided modes @1550 nm | 2 | 2 | 2 | 2 | 2 |
| LP11 cutoff (μm) | 2.2369 | 2.2114 | 2.2376 | 2.2882 | 2.1187 |
| LP02 cutoff (μm) | 1.3983 | 1.3825 | 1.3987 | 1.4300 | 1.3248 |
| LP12 cutoff (μm) | 0.9835 | 0.9723 | 0.9833 | 1.0049 | 0.9317 |
| LP21 cutoff (μm) | 1.4089 | 1.3929 | 1.4092 | 1.4409 | 1.3349 |
| MFD @ 1550 nm (μm) | 15.0 | 12.8 | 10.6 | 8.7 | 7.2 |
| LP01 Aeff @ 1550 nm (μm$^2$) | 191.9 | 138.7 | 95.5 | 65 | 44.0 |
| LP01 Dispersion @ 1550 nm (ps/nm/km) | 21.96 | 21.9 | 22.0 | 22.2 | 21.5 |
| LP01 Slope @ 1550 nm (ps/nm$^2$/km) | 0.0638 | 0.0633 | 0.0628 | 0.0622 | 0.0596 |
| Pump guided mode | LP01 | LP01 | LP01 | LP01 | LP01 |
| Probe guided mode | LP11 | LP11 | LP11 | LP11 | LP11 |
| $\overline{I}_u^{pp}$ | 0.994 | 0.994 | 0.994 | 0.994 | 0.994 |
| $\overline{I}_u^{ss}$ | 0.415 | 0.412 | 0.414 | 0.419 | 0.398 |
| Aeff pump guided mode (μm$^2$) | 191.6 | 138.5 | 95.5 | 65.4 | 44.1 |
| Aeff probe guided mode (μm$^2$) | 209.5 | 152.7 | 104.3 | 70.3 | 50.3 |
| F factor (μm$^2$) | 311.9 | 227.3 | 155.5 | 105.1 | 74.9 |

TABLE 3

Examples 6 and 7

| Example # | 6 | | | | 7 | | |
|---|---|---|---|---|---|---|---|
| $\Delta_0$ (%) | 0.4 | | | | 0.6 | | |
| $r_0$ (μm) | 10 | | | | 9.00 | | |
| Number of guided modes @ 1550 nm | 4 | | | | 5 | | |
| LP11 cutoff (μm) | 3.329 | | | | 3.6754 | | |
| LP02 cutoff (μm) | 2.0767 | | | | 2.292 | | |
| LP12 cutoff (μm) | 1.4557 | | | | 1.6055 | | |
| LP21 cutoff (μm) | 2.0926 | | | | 2.3095 | | |
| LP01 MFD @ 1550 nm (μm) | 15.4 | | | | 13.5 | | |
| LP01 Aeff @ 1550 nm (μm$^2$) | 216.5 | | | | 168.9 | | |
| LP01 Dispersion @ 1550 nm (ps/nm/km) | 22.5 | | | | 22.7 | | |
| LP01 Slope @ 1550 nm (ps/nm$^2$/km) | 0.0655 | | | | 0.0663 | | |
| Pump guided mode | LP01 | LP01 | LP01 | LP11 | LP01 | LP01 | LP01 |
| Probe guided mode | LP11 | LP02 | LP21 | LP01 | LP11 | LP02 | LP21 |
| $\overline{I}_u^{pp}$ | 0.987 | 0.987 | 0.987 | 0.482 | 0.984 | 0.984 | 0.984 |
| $\overline{I}_u^{ss}$ | 0.482 | 0.513 | 0.290 | 0.987 | 0.492 | 0.520 | 0.306 |
| Aeff pump guided mode (μm$^2$) | 216.6 | 216.6 | 216.6 | 205.2 | 169.1 | 169.1 | 169.1 |
| Aeff probe guided mode (μm$^2$) | 205.2 | 211.7 | 227.8 | 216.6 | 158.1 | 151.2 | 170.4 |
| F factor (μm$^2$) | 305.5 | 300.8 | 415.1 | 305.5 | 235.0 | 223.6 | 309.5 |

TABLE 4

Example 8

| Example # | 8 | | | | |
|---|---|---|---|---|---|
| $\Delta_0$ (%) | 1.00 | | | | |
| $r_0$ (μm) | 6.00 | | | | |
| Number of guided modes @ 1550 nm | 4 | | | | |
| LP11 cutoff (μm) | 3.1749 | | | | |
| LP02 cutoff (μm) | 1.9808 | | | | |
| LP12 cutoff (μm) | 1.388 | | | | |
| LP21 cutoff (μm) | 1.9958 | | | | |
| LP01 MFD @ 1550 nm (μm) | 9.4 | | | | |
| LP01 Aeff @ 1550 nm (μm$^2$) | 79.4 | | | | |
| LP01 Dispersion @ 1550 nm (ps/nm/km) | 23.4 | | | | |
| LP01 Slope @ 1550 nm (ps/nm$^2$/km) | 0.0663 | | | | |
| Pump guided mode | LP01 | LP01 | LP01 | LP11 | LP11 |
| Probe guided mode | LP11 | LP02 | LP21 | LP02 | LP21 |
| $\overline{I}_u^{pp}$ | 0.989 | 0.989 | 0.989 | 0.476 | 0.476 |
| $\overline{I}_u^{ss}$ | 0.476 | 0.509 | 0.280 | 0.989 | 0.280 |
| Aeff pump guided mode (μm$^2$) | 75.6 | 79.6 | 79.6 | 76.0 | 76.0 |

TABLE 4-continued

Example 8

| Example # | 8 | | | | |
|---|---|---|---|---|---|
| Aeff probe guided mode ($\mu m^2$) | 76.0 | 82.8 | 86.0 | 79.6 | 86.0 |
| F factor ($\mu m^2$) | 113.4 | 114.5 | 157.4 | 113.4 | 221.7 |

Experimental Results

First four experiments were carried out on system 10 of FIG. 1. Pump light source 20 was configured as shown in FIG. 2A as a master oscillator power amplifier (MOPA) with a single-frequency fiber laser 24 having a linewidth less than 1 kHz and a single-mode fiber optical amplifier 26. The wavelength of the fiber laser 24 was 1550.134 nm. Probe light source 30 was configured as shown in FIG. 2B as a MOPA with tunable semiconductor laser 34 having a linewidth of about 700 kHz, and a single-mode fiber optical amplifier 36. Tunable semiconductor laser 34 was tunable between 1500 nm to 1580 nm, with a finest tuning step of 0.001 nm. A tunable optical filter 27 with a 1 nm spectral bandwidth was used to filter the spontaneous emission outside of the pump wavelength bandwidth (see FIG. 2A).

All optical fibers 60 used in the two MOPAs constituting the pump and probe light sources 20 and 30 were single-guided-mode. Probe light source 30 utilized free-space optical coupling (see, e.g., light-coupling optical system 80 of FIG. 2B) into one of the input ports of a 1×2 multimode fiber coupler 40-2.

It is noted that the excited guided mode(s) supported by multimode sensing optical fiber 50 can be selected by the proper setting of the offset between the output single-mode fiber pigtail of the probe MOPA and the input multimode fiber pigtail (fiber section F2) of multimode coupler 40-2. The 1×2 multimode fiber coupler 40-1 then combines the probe light 32 with the pump light 22 as described above. The combined pump light 22 and probe light 32 were launched into sensing optical fiber 50 through a multimode fiber optical circulator 42 (see FIG. 1B).

The coupling ratios of both couplers 40-1 and 40-2 were approximately 50:50. The output single-mode fiber pigtail of the pump MOPA and the input multimode fiber pigtail of the second coupler was center-to-center spliced in order to excite only the fundamental guided mode in sensing optical fiber 50. Thus, in FIG. 1, fiber section F1 actually comprised two spliced fiber sections. The reflected light from the few-guided mode fiber was monitored by receiver 100 in the form of an optical spectral amplifier.

First Experiment

In a first experiment, sensing optical fiber 50 was 16.16 km long and supported a fundamental guided mode $LP_{01}$ and one high-order guided mode $LP_{11}$. The guided mode-field diameter of the fundamental guided mode was 14.2 µm, and the loss at 1550 nm was 0.188 dB/km. The pump light 22 was carried only in the $LP_{01}$. Also, by properly setting the offset between the output single-mode fiber pigtail (optical fiber 60) of the MOPA probe light source 32 and the input multimode fiber pigtail (fiber section F2) of the multimode coupler, the probe light 32 excited only the $LP_{11}$ guided mode.

Figure 7A:
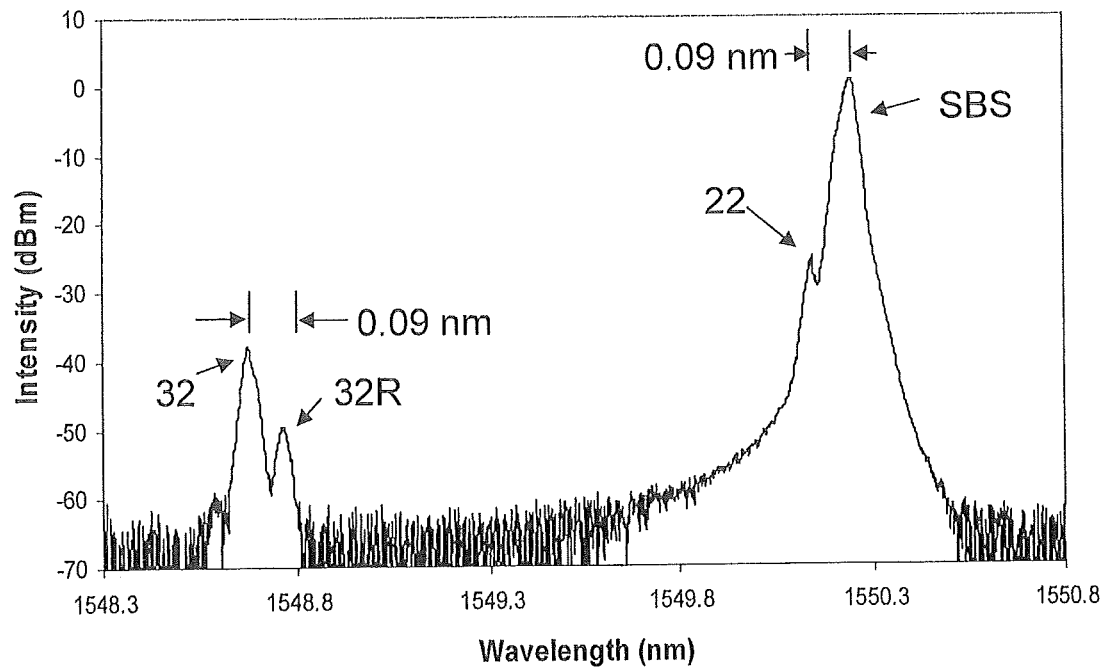
FIG. 7A shows the measured optical spectrum of the reflected light from a sensing optical fiber as measured by the receiver in a first experiment wherein the pump light and probe light are supported by the $LP_{01}$ and $LP_{11}$ guided modes, respectively.

FIG. 7A shows the measured optical spectrum of the reflected light from sensing optical fiber 50 as measured by receiver 100 when the wavelength λ2 of the probe light 32 is tuned to the wavelength of BDG 54 for the $LP_{11}$ guided mode (the wavelength relationship between pump and probe light satisfies Eq. (2a)). The pump and probe powers launched into sensing optical fiber 50 were about 375 mW and about 5.6 mW, respectively.

Figure 7B:
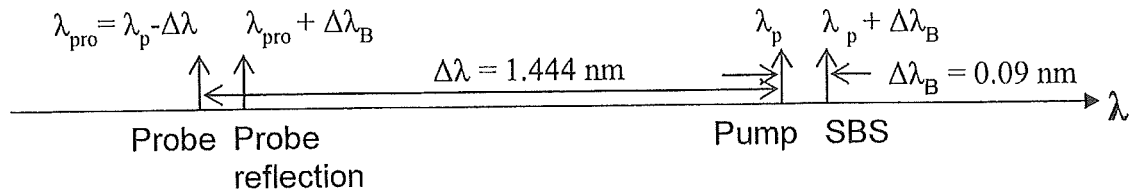
FIG. 7B illustrates the wavelength relationships between the pump light ($LP_{01}$), the probe light ($LP_{11}$), and probe reflected light.

FIG. 7B illustrates the wavelength relationships of the pump light 22 ($LP_{01}$), the probe light 32 ($LP_{11}$), and probe reflected light 32R. As shown in FIG. 7A, the highest peak at 1550.224 nm on the right is the SBS of the pump light 22, and the second peak (at 1550.134 nm) next to the left is the Rayleigh scattering reflection of the pump light 22 in the few-guided mode fiber. The wavelength shift of SBS is Δλ=0.09 nm, corresponding to a Brillouin frequency shift of 11.25 GHz. The peak at 1548.69 nm is the Rayleigh scattering reflection of the probe light 32 in the few-guided mode fiber, and the peak at 1548.78 nm is the reflected probe light 32R from BDG 54. The reflected probe light 32R has a wavelength (frequency) shift of Δλ=0.09 nm (11.25 GHz), which is the same as the Brillouin frequency shift of the pump light 22.

The wavelength difference Δλ between pump light 22 and probe light 32 is about 1.444 nm, corresponding to an effective index different between $LP_{01}$ and $LP_{11}$ guided modes being ~$1.329 \times 10^{-3}$. Since the probe SBS and the reflected probe light 32R have the same wavelength, it should be confirmed that the wavelength peak at −1548.78 nm is not arising from the probe SBS, but from the reflection of BDG 54 formed by the pump light 22.

To perform such confirmation, the optical spectra of the reflected light from sensing optical fiber 50 was measured for two different operating states of system 10: 1) pump amplifier 26 on and probe light source 30 on and 2) pump amplifier 26 is off, and probe light source 30 on.

Figure 8:
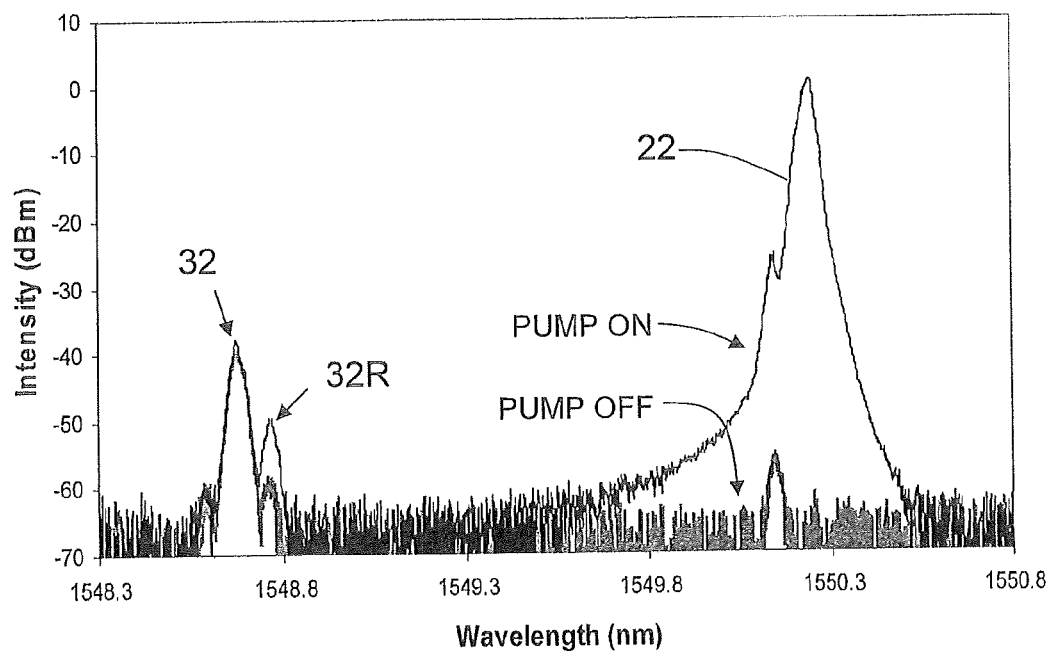
FIG. 8 plots the measured spectra as measured by the receiver for two different operating states of the sensing system to confirm that the wavelength peak at 1548.78 nm is not arising from the probe SBS but from the reflection of the BDG formed by the pump light.

The measured spectra for these two operational states are shown in FIG. 8. When the pump amplifier 26 is switched off ("PUMP OFF"), the second peak from the left disappears from the "PUMP ON" curve because of the disappearance (or decrease of the reflectivity) of BDG 54 due to the decrease of the pump power. This also confirms that the second left peak is not arising from the SBS of probe light 32.

Figure 9:
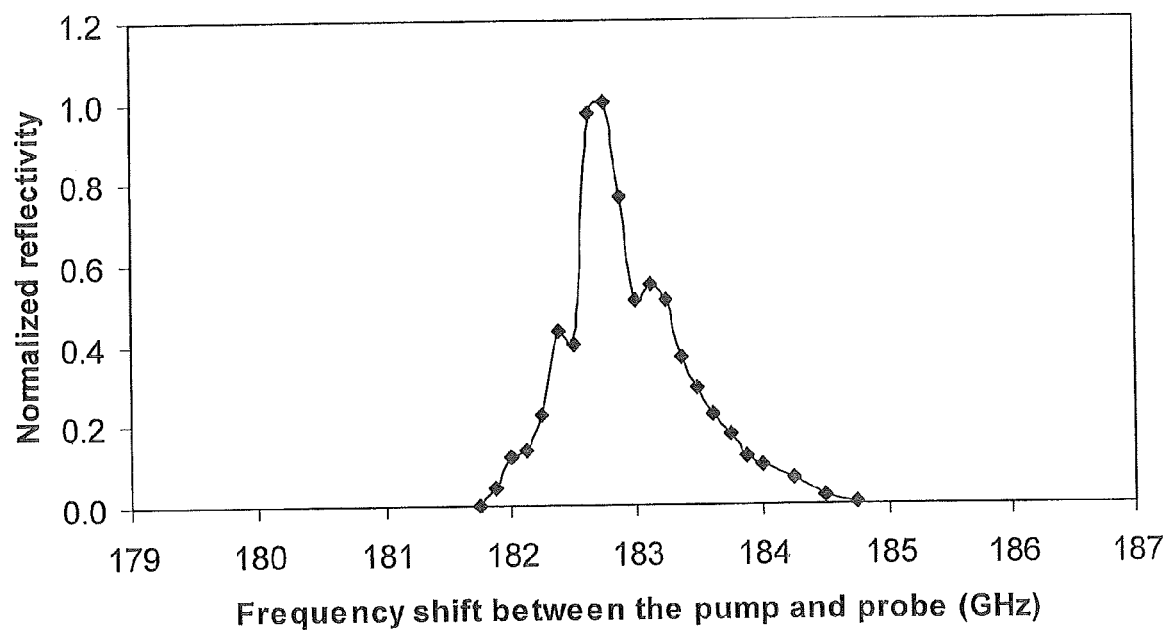
FIG. 9 plots the measured BDG spectrum for the probe light ($LP_{11}$ guided mode)

FIG. 9 plots the measured BDG spectrum for probe light 32 ($LP_{11}$ guided mode). The 3 dB reflection bandwidth Δν is about 0.75 GHz, which is much broader than typical spectral width of a SBS gain spectrum. It is believed that the non-uniformity along sensing optical fiber 50 causes the broadening of the reflection bandwidth of the BDG 54.

Figure 10:
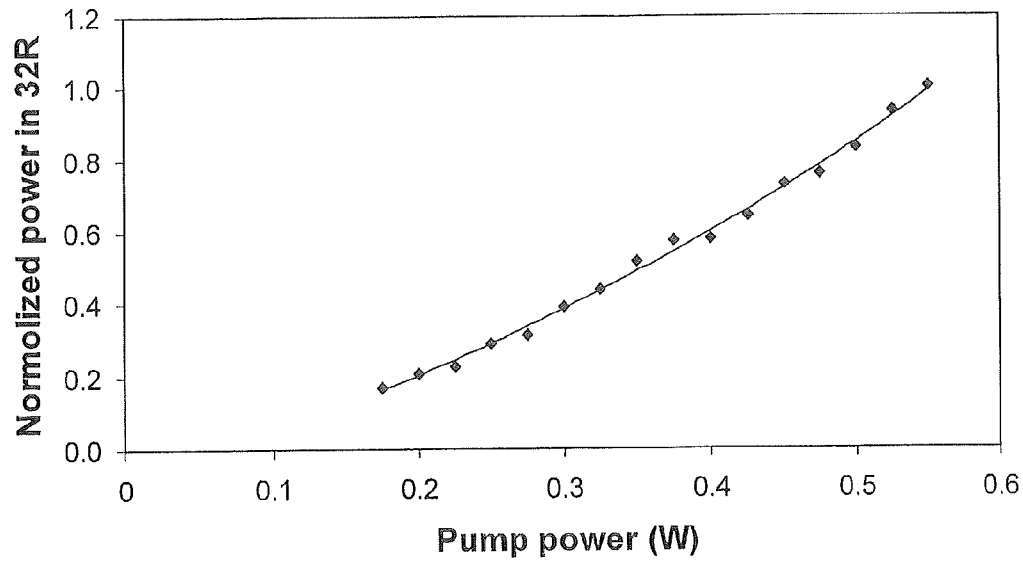
FIG. 10 plots the change of the normalized power of the reflected probe light with the pump light power.

FIG. 10 plots the change of the normalized power of the reflected probe light 32R with the pump light power. The fitted curve indicates that the power of the reflected probe light 32R is exponentially growing with the increase in power of pump light 22.

Second Experiment

In the second experiment, a 5.5 km long sensing optical fiber 50 was used. The sensing optical fiber 50 has a step-index profile with index difference Δ between the core 56 and the clad 58 of about 0.34%, and the core radius of about r=6.9 µm. The guided mode-field diameter of the fundamental guided mode is ~12.8 µm. Sensing optical fiber 50 was configured to support only a fundamental guided mode ($LP_{01}$) and one high-order guided mode ($LP_{11}$).

The pump light 22 was introduced into sensing optical fiber 50 such that it only traveled in the $LP_{01}$ guided mode. By properly setting the offset between the output single-mode fiber pigtail of the MOPA probe light source 30 (i.e., single-mode optical fiber 60) and the input multimode fiber pigtail of the multimode coupler (i.e., fiber section F2), the probe light 32 was made to excite only the $LP_{11}$ guided mode.

Figure 11:
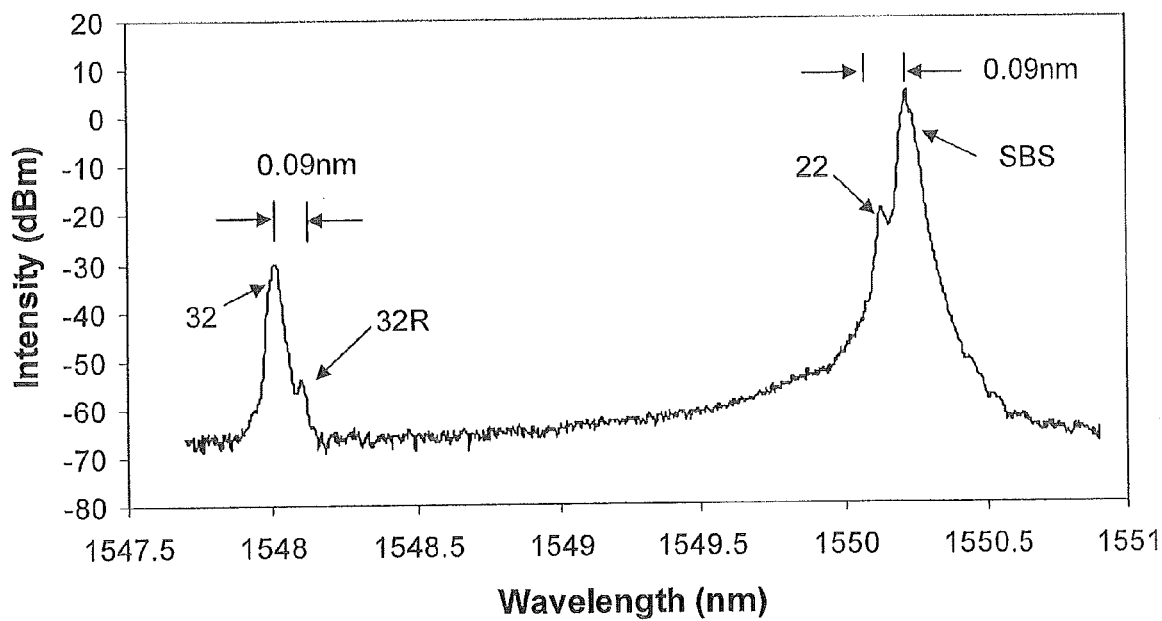
FIG. 11 plots the optical spectrum of the reflected light from the sensing optical fiber as measured by the receiver in a second experiment wherein the pump light and probe light are supported by the $LP_{01}$ and $LP_{11}$ guided modes, respectively.

FIG. 11 plots the optical spectrum of the reflected light from sensing optical fiber 50 as measured by receiver 100 when the pump light 22 and probe light 32 travel in the $LP_{01}$ and $LP_{11}$ guided mode, respectively. The pump and probe powers launched into sensing optical fiber 50 were about 375 mW and about 5.6 mW, respectively. The wavelengths of the pump light 22 and probe light 32 were $\lambda1=1550.134$ nm and $\lambda2=1548.017$ nm, respectively.

Figure 12:
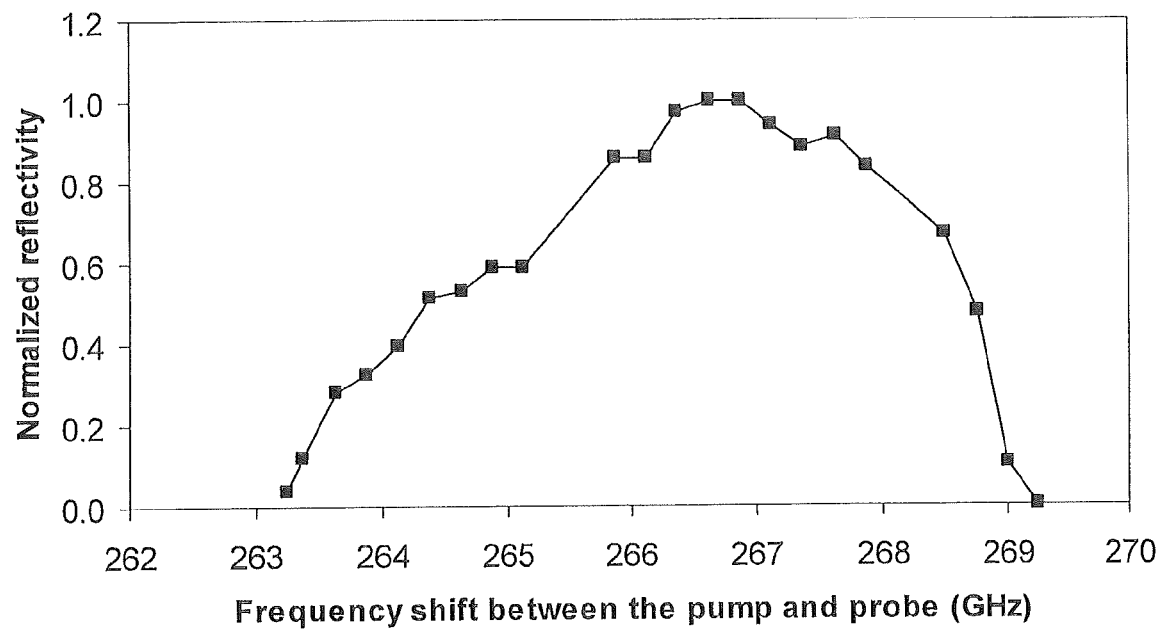
FIG. 12 plots the measured BDG spectrum for the probe ($LP_{11}$ guided mode) for the second experiment.

Again, the reflection peak of the probe light 32, which has 0.09 nm up-shift (Brillouin wavelength shift $\Delta\lambda_B$) from the probe wavelength, is clearly observed. FIG. 12 plots the measured BDG spectrum for the probe ($LP_{11}$ guided mode). The 3 dB reflection bandwidth $\Delta v$ is about 4.375 GHz, which is about 6 times larger than that of the sensing optical fiber 50 of the first example. Considering that the length of the sensing optical fiber 50 in this second example is only about one third that of the sensing optical fiber of the first example, the fiber uniformity of this second sensing optical fiber should be much worse than that of the first. This suggests that the uniformity of BDG 54 can be detected if probe light 32 in the form of a short pulse is used.

Third Experiment

In above two experiments, the order of the probe guided mode ($LP_{11}$) is higher than that of the pump guided mode ($LP_{01}$). In a third experiment, the guided mode used for probe light 32 was lower than that for pump light 22.

In the third experiment, the experimental setup was essentially same as that shown in FIG. 1B, except that optical fiber section F2 optically coupled to probe light source 30 was center-to-center spliced to one of the inputs of the multimode optical coupler 40 to excite the LP01 guided mode in sensing optical fiber 50. Optical fiber section F1 optically coupled to the pump light source 30 was free-space coupled to the other input of multimode optical coupler 40 to excite the LP11 guided mode sensing optical fiber 50.

Sensing optical fiber 50 was 10 km long, had a guided mode-field diameter of about 12 μm, and supported just a fundamental guided mode ($LP_{01}$) and one high-order guided mode ($LP_{11}$). The index difference $\Delta$ between core 56 and cladding 58 was about 0.4%.

Figure 13:
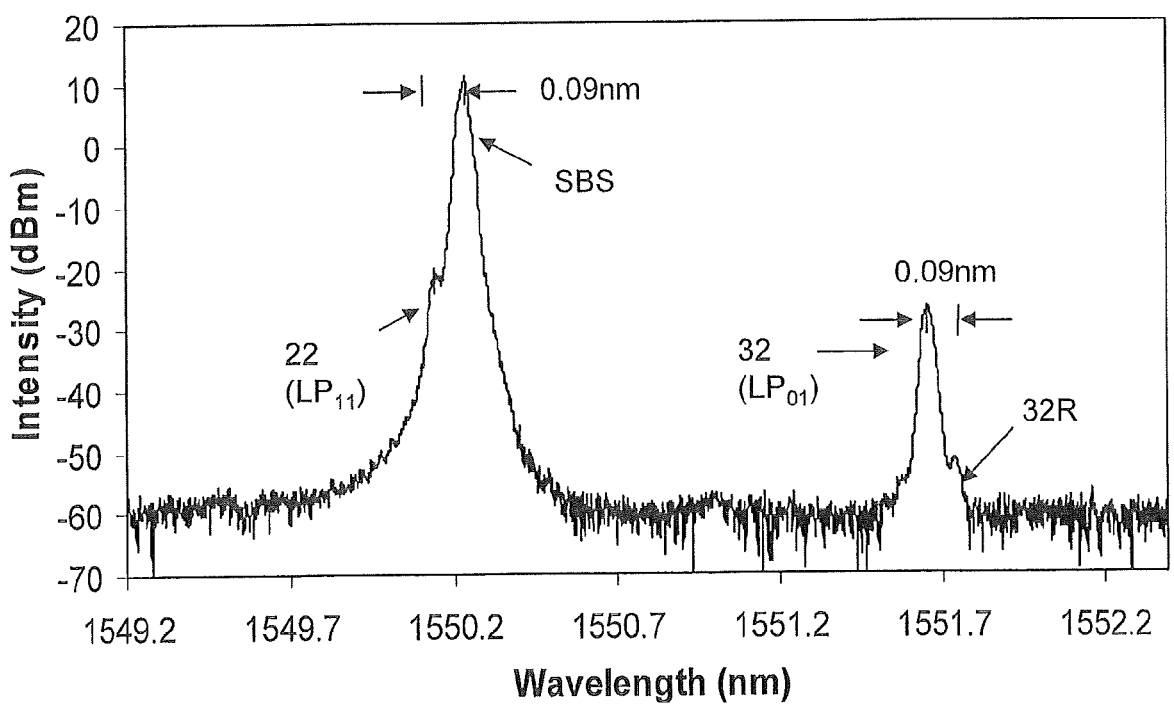
FIG. 13 plots the optical spectrum of the reflected light from the sensing optical fiber as measured by the receiver for a third experiment wherein the pump light and the probe light are supported by the $LP_{11}$ and $LP_{01}$ guided modes, respectively.

Pump light 22 was provided to sensing optical fiber 50 such that it was carried in the $LP_{11}$ guided mode. The probe light 32 was provided to sensing optical fiber 50 such that it was supported by the $LP_{01}$ guided mode. FIG. 13 plots the optical spectrum of the reflected light from sensing optical fiber 50 as measured by receiver 100 when the pump light 22 and probe light 32 travel in the $LP_{11}$ and $LP_{01}$ guided mode, respectively. The pump and probe powers launched into sensing optical fiber 50 were about 500 mW and about 5.6 mW, respectively. The wavelengths of the pump and probe were $\lambda1=1550.134$ nm and $\lambda2=1551.654$ nm, respectively. Again, the reflection peak of the reflected probe light 32R, which had a 0.09 nm up-shift (Brillouin wavelength shift $\Delta\lambda_B$) from the probe wavelength $\lambda2$, is clearly observed.

Fourth Experiment

In above three experiments, the both probe light 32 and pump light 22 were CW. In a fourth experiment, the probe light was pulsed with 1 ns pulse width. System 10 was configured essentially the same as shown in FIG. 1B, with the probe light source 30 including a 1 ns pulsed laser source that employed an optical modulator (not shown) which inserted between the tunable laser 34 and the optical amplifier 36 (see FIG. 3B). Probe light 32 included 1 ns pulses with a repetition rate of 100 kHz. Sensing optical fiber 50 was the same 16 km optical fiber used in the first experiment described above. The pump light 22 was carried in the $LP_{01}$ guided mode. Also, by properly setting the offset between the output single-mode fiber pigtail of the MOPA probe light source 32 and the input multimode fiber pigtail (fiber section F2) of the multimode coupler, the probe light 32 could be made to excite the $LP_{11}$ guide mode in sensing optical fiber 50.

Figure 14:
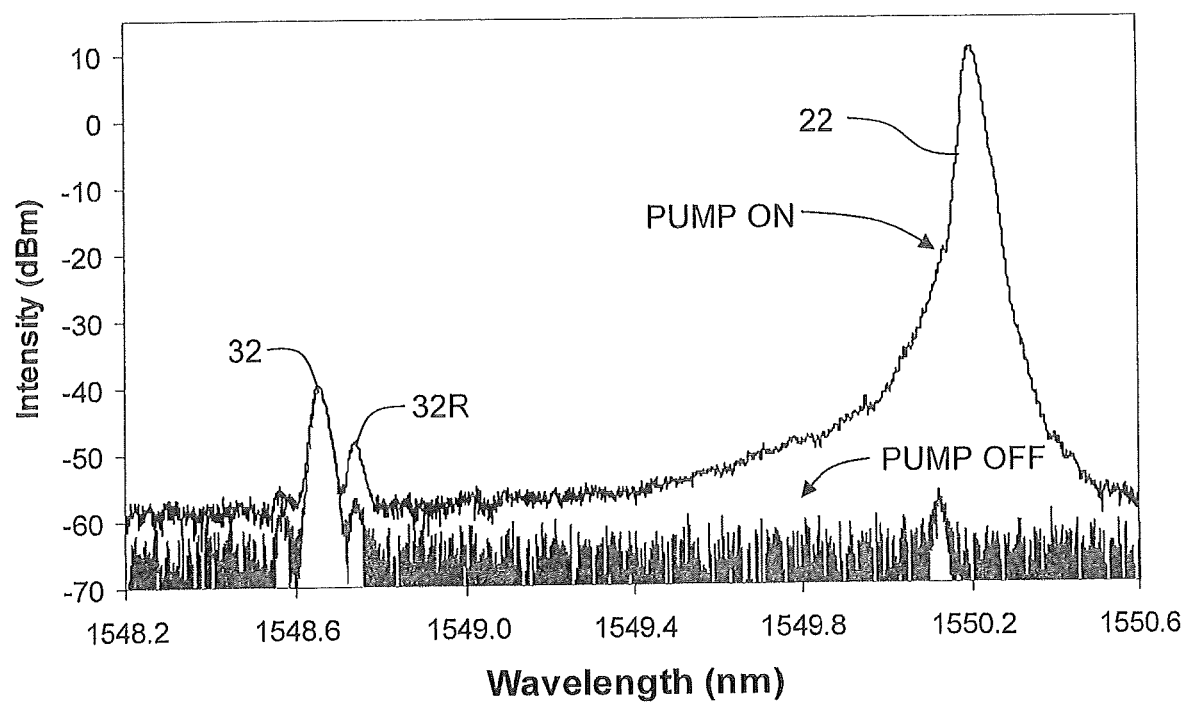
FIG. 14 plots the optical spectra of the reflected light from the sensing optical fiber for two different operating states as measured by the receiver in a fourth experiment wherein the pump light and probe light are supported by the $LP_{01}$ and $LP_{11}$ guided modes, respectively.

FIG. 14 shows the measured optical spectra of the reflected light from sensing optical fiber 50 as measured by receiver 100 in the form of an optical spectral analyzer, wherein the wavelength of probe light 32 was tuned to the wavelength of BDG 54 for the $LP_{11}$ guided mode so that the wavelength relationship between pump and probe light satisfies Eq. (2a). The curves in FIG. 14 were the measured optical spectra for the cases of the pump light on and off. The pump and average probe powers launched into sensing optical fiber 50 were about 390 mW and about 10 mW, respectively.

Again, the reflection peak of the probe light 32, which has a 0.09 nm up-shift (Brillouin wavelength shift $\Delta\lambda_B$) from the probe wavelength, is clearly observed.

Fifth Experiment: Demonstration of the Feasibility of Simultaneous Strain and Temperature Measurement—Measurement of Strain and Temperature Coefficients $K_\lambda^\epsilon$ and $K_\lambda^T$ of Sensing Optical Fiber 50 (Few-Mode Fiber (FMF)).

Figure 15:
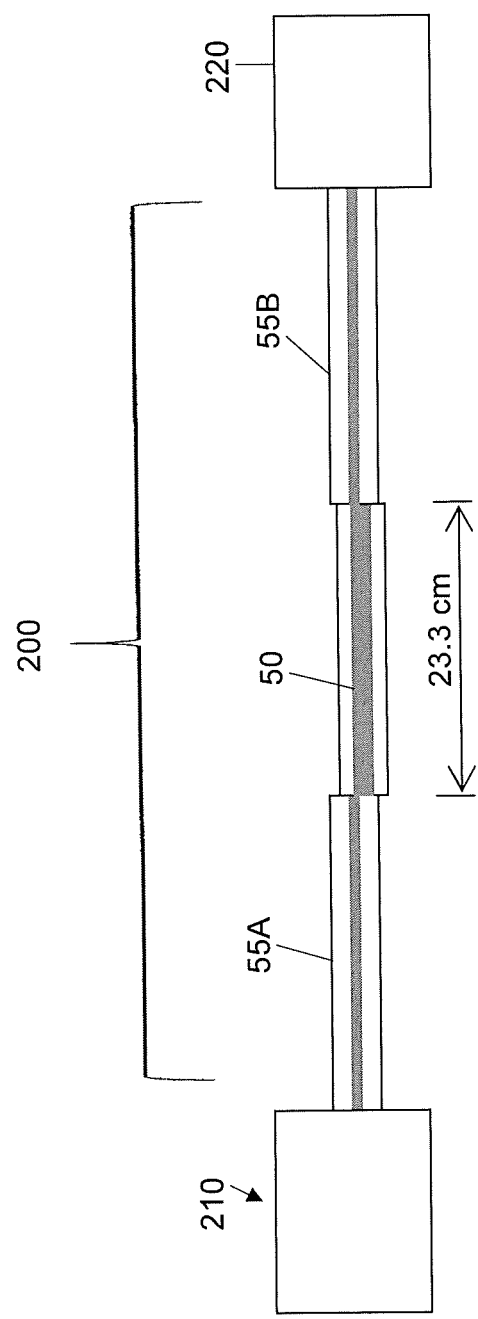
FIG. 15 is a schematic illustration of an interferometer for measuring strain and temperature coefficients in a few mode fiber (FMF)

The Experiments were carried out using the systems shown in FIG. 15. With reference to FIG. 15, in order to measure FMF strain and temperature coefficients $K_\lambda^\epsilon$ and $K_\lambda^T$ in a sensing fiber 50, we use a FMF interferometer 200. The interferometer 200 includes two pieces of standard single mode fiber (SMF) 55A and 55B (i.e., single mode at 1550 nm) and one piece of 23.3 cm long FMF (sensing fiber 50) which is similar to the one used in the first experiment. As shown in FIG. 15, the FMF (sensing fiber 50) is spliced between the two pieces of SMF 55A and 55B. At the input side, in order to excite both fundamental (LP01) and first high order mode (LP11) in the FMF, the sensing fiber 50 and the SMF 55A are spliced together with proper offsetting between the core axes of the two fibers. At the output side, the sensing fiber 50 and SMF 55B are also off-set. A fiber-pigtailed broadband (1535-1561 nm) light source 210 is connected to the input end of SMF 55A. The output light from the interferometer (at the output end of the SMF fiber 55B) is monitored by an optical spectral analyzer 220. Because effective optical path length difference between $LP_{01}$ and $LP_{11}$ modes, the interference fringe(s) will be observed in the output optical spectrum. The lights of LP01 and LP11 modes, at the output, are in phase when $$\frac{2\pi \Delta n_{\it eff} L}{\lambda} = 2m\pi \qquad (12)$$

where $\Delta n_{\it eff}$ is the effective refractive index difference between LP01 and LP11 modes, L is the length of FMF, $\lambda$ is the wavelength of light in vacuum, m is an integrate number. When strain is applied to the few-mode fiber (sensing fiber 50), the wavelength of $m^{th}$ in-phase peak changes with the length change of FMF (dl) caused by the strain ($d\epsilon$). The change in the wavelength can be expressed as $$d\lambda = \lambda B_\varepsilon d\varepsilon = \lambda B_\varepsilon \frac{dl}{L} \qquad (13)$$

with $$B_\varepsilon = \frac{d(\Delta n_{\it eff})}{d\varepsilon} \frac{1}{\Delta n_{\it eff}} + \frac{dL}{d\varepsilon}\frac{1}{L} \qquad (13a)$$

Then, the relationship between the wavelength of $m^{th}$ in-phase peak and fiber length change due to the strain is $$\lambda = \lambda_0 e^{B_\varepsilon \frac{\Delta L}{L}} \qquad (14)$$

where $\lambda_0$ is the wavelength of $m^{th}$ in-phase peak when no strain is applied to the FMF, and $\Delta L$ is the length change of the FMF due to the strain.

If $B_\varepsilon \Delta L/L \ll 1$, equation (14) becomes $$\lambda = \lambda_0 \left(1 + B_\varepsilon \frac{\Delta L}{L}\right) \qquad (15)$$

Then, the strain coefficient $K_\lambda^\varepsilon$ of the wavelength difference between pump and probe can be obtained from $$K_\lambda^\varepsilon = \Delta \lambda_0 B_\varepsilon = \left(\frac{\lambda_p \Delta n_{eff,0}}{n_{eff,p}}\right) B_\varepsilon \qquad (16)$$

where $n_{eff,p}$ is the effective refractive index of pump mode, and $\Delta \lambda_0$ and $\Delta n_{eff,0}$ are, respectively, wavelength and effective index differences between pump mode and probe mode (or between LP01 and LP11 modes) when no strain is applied to the fiber.

The wavelength change of $m^{th}$ in-phase peak with temperature variation can be written as $$d\lambda = \lambda B_T dT \qquad (17)$$
with
$$B_T = \frac{d(\Delta n_{eff})}{dT} \frac{1}{\Delta n_{eff}} + \frac{dL}{dT} \frac{1}{L} \qquad (17a)$$

Then, the relationship between the wavelength of $m^{th}$ in-phase peak and temperature change is $$\lambda = \lambda_0 e^{B_T(T-T_0)} \qquad (18)$$

where $\lambda_0$ is the wavelength of $m^{th}$ in-phase peak at initial temperature $T_0$.

If $B_T(T-T_0) = B_T \Delta T \ll 1$, equation (18) becomes $$\lambda = \lambda_0 (1 + B_T \Delta T) \qquad (19)$$

Thus, the temperature coefficient $K_\lambda^T$ for the wavelength difference between pump and probe can be obtained from $$K_\lambda^T = \Delta \lambda_0 B_T = \left(\lambda_p \frac{\Delta n_{eff,0}}{n_{eff,p}}\right) B_T \qquad (20)$$

where $\Delta \lambda_0$ and $\Delta n_{eff,0}$ are, respectively, wavelength and effective index differences between pump mode and probe mode (or between LP01 and LP11 modes) when the temperature is at $T_0$.

Figure 16:
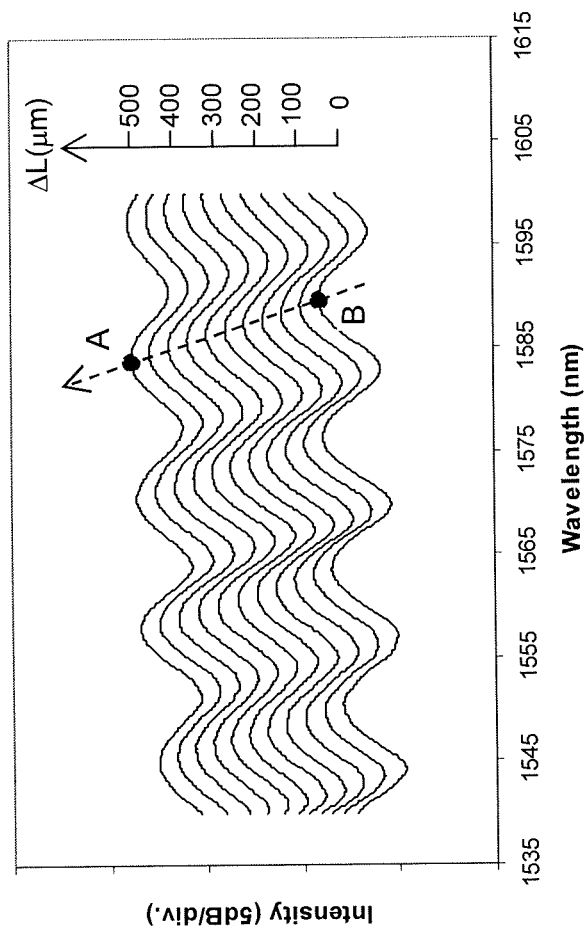
FIG. 16 illustrates the change of the transmission spectrum produced by the interferometer of FIG. 15, due to the change in length in the FMF.

To measure strain coefficient, one end of the FMF is fixed on a post, the other end is attached on a micrometer translation stage. By moving the translation stage, strain is applied to the FMF to produce a length change in FMF. We had evaluated the change transmission spectrum relative to the length change in FMF. More specifically, FIG. 16 illustrates the transmission spectrum of the interferometer 200 (intensity as a function of wavelength), and also shows changes in the transmission spectrum of the interferometer 200 with length change $\Delta L$ of FMF. The transmission spectrum is the output spectrum measured at the end of the second SMF minus the input spectrum provided at the input end to the first SMF fiber. FIG. 16 shows 6 curves, each corresponding to a different $\Delta L$ value, where $\Delta L$ was changed in 100 μm increments, from $\Delta L=0$ to μm $\Delta L=500$ μm. It is clearly seen from the plots that the transmission spectrum shifts to the short wavelength side with the increase of strain. More specifically, FIG. 16 shows that the peak wavelengths corresponding to fourth transmission light intensity peak (see arrow) from left changed from about 1590 nm ($\Delta L=0$, point B) to about 1584 nm (point A) when $\Delta L=500$ μm.

Figure 17:
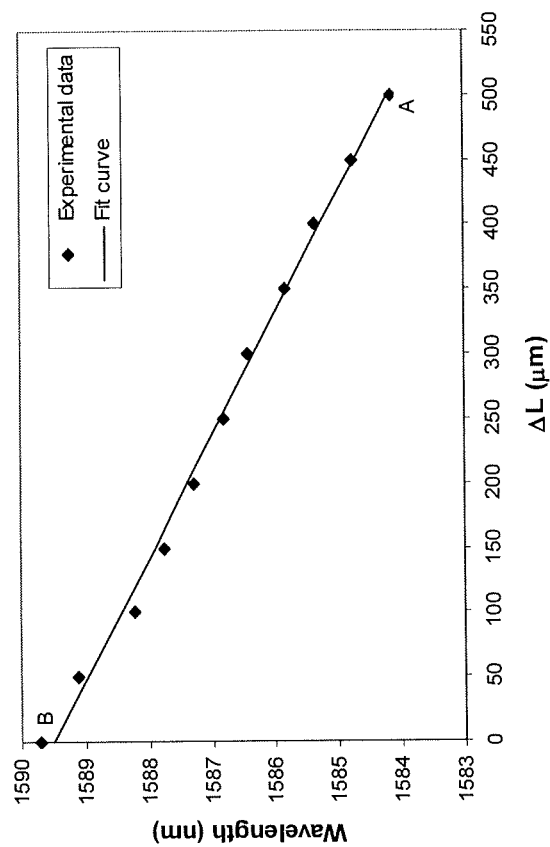
FIG. 17 is a plot of measured peak wavelengths (intensity maxima) as a function of length change ΔL of the FMF, which correspond to the $4^{th}$ transmission peak from the left shown in FIG. 6.

FIG. 17 shows a plot of measured of the wavelength (corresponding to the $4^{th}$ peak in FIG. 16) versus length change $\Delta L$ for the of the FMF, as well as plotted fit curve of the peak wavelengths for the fourth transmission peak versus $\Delta L$. The left side of the graph corresponds to point B ($\Delta L=0$), and the right side of the graph corresponds to point A ($\Delta L=500$ μm). The fit curve corresponds the following equation: $\lambda = a\Delta L + b$, a=−0.01060 nm/μm, b=1589.5073 nm. Then we us, we can calculate that $B_\varepsilon = -1.5544e^{-6}/\mu\varepsilon$. By considering the measured parameters: $\lambda_p = 1550$ nm, $\Delta n_{eff} = 1.386 \times 10^{-3}$, and $n_{eff} = 1.47$, we find that the strain coefficient $K_\lambda^\varepsilon$ of the FMF for the wavelength difference between pump and probe is $K_\lambda^\varepsilon = -0.002269$ pm/μɛ.

Figure 18:
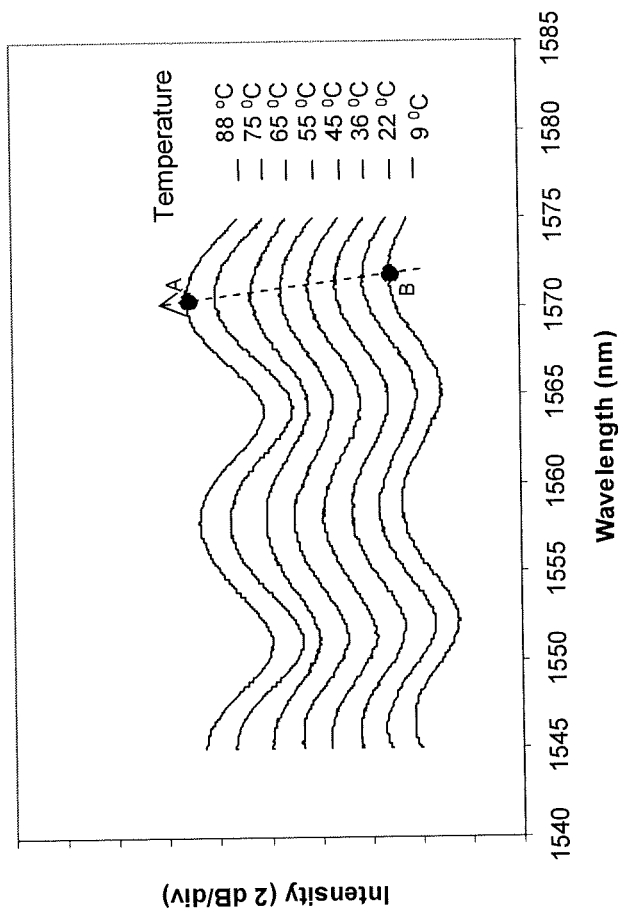
FIG. 18 illustrates the change of the transmission spectrum of the interferometer with temperature.
Figure 19:
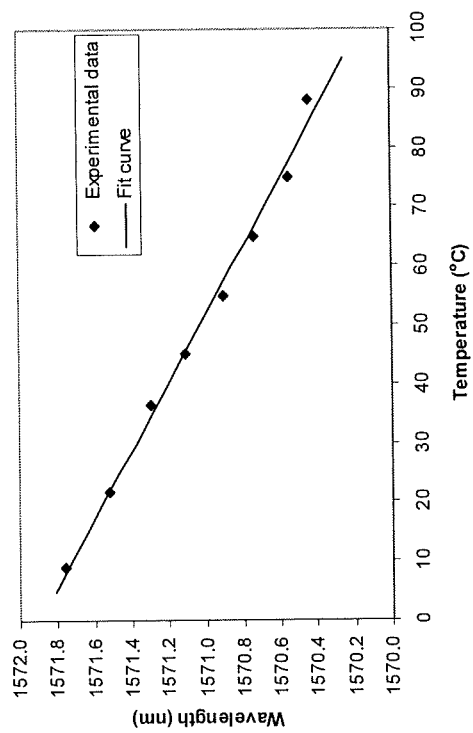
FIG. 19 is a plot of the peak wavelength of the right transmission peak (intensity maxima) shown in FIG. 18, versus temperature.

To measure temperature coefficient, the FMF is loosely put into a temperature chamber. Next, we evaluated the change transmission spectrum relative to the temperature change, by subjecting FMF to different temperatures. The temperatures were varied from 9° C. to 88° C. More specifically, FIG. 18 illustrates the transmission spectrum of the interferometer 200 (intensity as a function of wavelength), and also shows changes in the transmission spectrum of the interferometer 200 with temperature changes. FIG. 18 shows six curves, each corresponding to a different temperature, starting with the initial temperature of T=9° C. to the final temperature of 88° C. It is clearly seen that the transmission spectrum shifts to the short wavelength side with the increase of temperature. More specifically, FIG. 18 shows that the peak wavelength corresponding to second transmission light intensity peak from left changed from about 1571.7 nm (at T=9° C.) to about 1570.5 nm (at T=88° C.). FIG. 19 shows the change of the transmission spectrum, and more specifically the wavelength change for the in-phase peak shown on the right hand side of FIG. 18 with temperature. FIG. 19 also illustrates the best fit curve of the peak wavelength versus temperature. The fit curve is described by the following equation: $\lambda = a\Delta T + b$, a=−0.01742 nm/° C., b=1571.9004 nm. Then, we get $B_T = -1.1083 \times 10^{-5}/°$ C. By considering the measured parameters: $\lambda_p = 1550$ nm, $\Delta n_{eff} = 1.386 \times 10^{-3}$, and $n_{eff} = 1.47$, we find that the temperature $K_\lambda^T$ of the FMF for the wavelength difference between pump and probe is $K_\lambda^T = -0.016197$ pm/° C.

Figure 20:
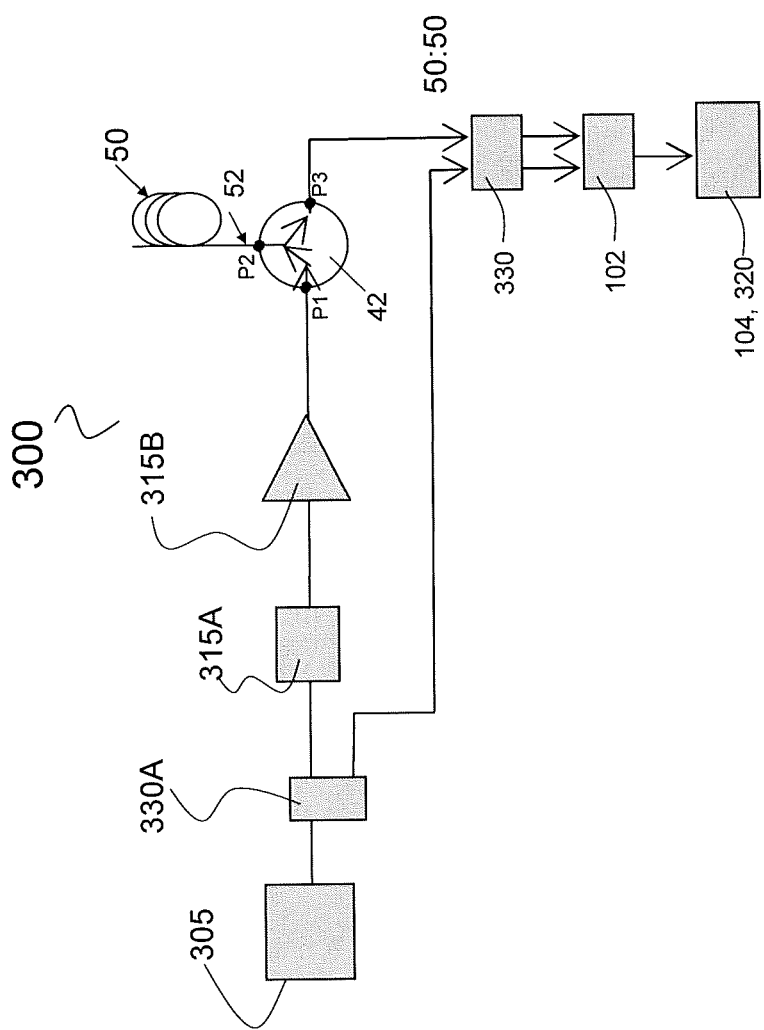
FIG. 20 illustrates the experimental system for measuring the changes of Brillouin frequency Shift (BFS) of FMF due to changes in strain and temperature.
Figure 21:
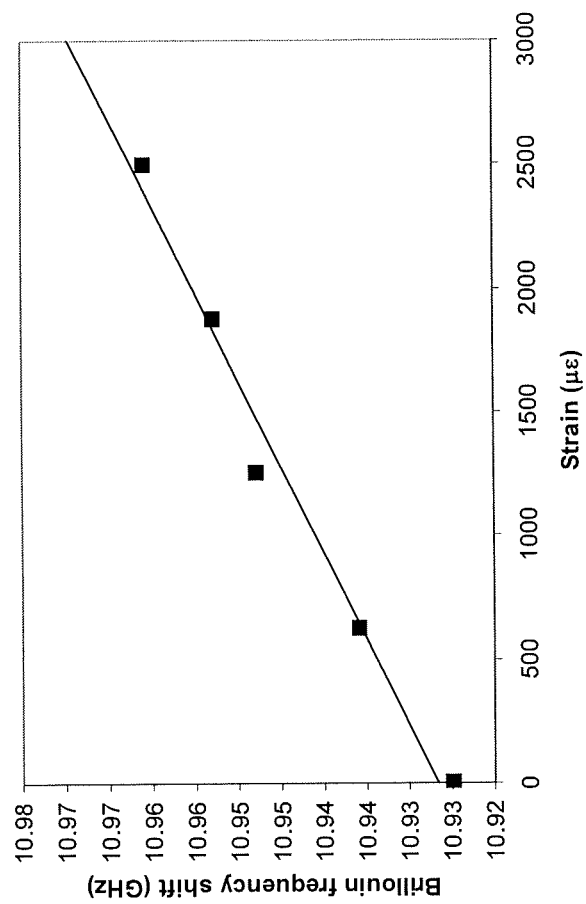
FIG. 21 shows a plot of measured BFS data in FMF of FIG. 20, as a function of strain, and best fit linear curve through this data.
Figure 22:
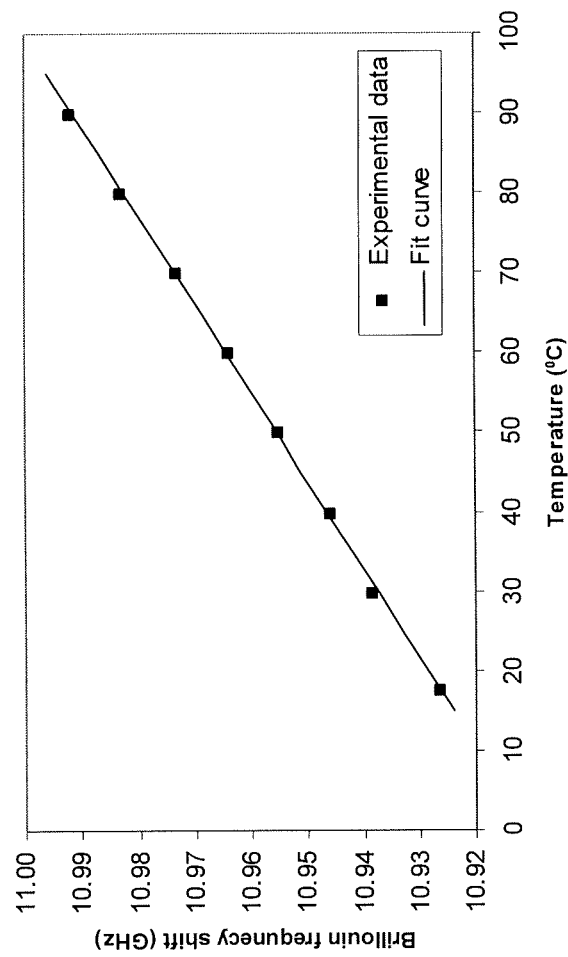
FIG. 22 illustrates a plot of measured BFS data in FMF of FIG. 20, as a function of temperature and best fit linear curve through this data.

Measurement of Strain and Temperature Coefficients $K_v^\varepsilon$ and $K_v^T$ of FMF The Experiments were carried out using the systems shown in FIG. 20. FIG. 20 shows the exemplary experimental system 300 for measuring the changes of Brillouin Frequency shift, BFS, when strain or temperature differences were applied to the FMF (sensing fiber 50). System 300 includes a DFB laser source 305 that provides light to the sensing fiber 50 via a circulator 42. The input light enters port P1 of the optical circulator and enters input/output end 52 of the sensing fiber 50 via port P2 of the circulator. The light from the sensing fiber 50 is then provided through the input/output end 52 back to the port P2 of the circulator 42 from which it is routed towards the photo detector 102 via port P3 of the optical circulator and through the 50:50 optical coupler 330. The output of photo detector 102 is then analyzed by the processor 104 (e.g., spectral analyzer 320). More specifically, the light from the DFB laser source 305 is split into two portions, for example by a 90:10 optical coupler 330A. One portion (e.g., 90%), is amplified via one or more amplifiers (for example, a SOA 315A and an Er doped fiber amplifier 315B) and, as described above, is send toward the sensing fiber 50, while the other portion (e.g., 10%) is provided directly to the optical coupler 330. The photo detector 102 thus receives, from the optical coupler 330 both the input light provided by the DBR laser (unmodified by the sensing fiber 50), and the light output (Brillouin scattering light) provided by the sensing fiber 50 which includes the information of Brillouin Frequency shift, BFS. The frequency difference between two light portions (or Brillouin Frequency shift) will change with strain and/or temperature. FIG. 21 is a plot of the BFS values (με) versus strain and also shows the linear best fit plot of BFS vs strain in the (FMF) sensing fiber 50. From the fit function ($v_B = a\epsilon + b$, $a = 0.0143$ MHz/με, $b = 10.9267$ GHz), we know that the strain coefficient $K_v^\epsilon$ of the FMF is $K_v^\epsilon = 0.0143$ MHz/με. FIG. 22 shows the curves of BFS values versus temperature and the corresponding best fit function. From the fit function ($v_B = aT + b$, $a = 0.9005$ MHz/°C., $b = 10.9105$ GHz), we know that the temperature coefficient $K_v^T$ of the FMF is $K_v^T = 0.9005$ MHz/° C. The measured strain and temperature coefficients of the FMF are $K_\lambda^\epsilon = -0.00227$ pm/με; $K_\lambda^T = -0.01610$ pm/° C.; $K_v^\epsilon = 0.0143$ MHz/με; $K_v^T = 0.9005$ MHz/° C., which results in $K_\lambda^\epsilon K_v^T - K_\lambda^T K_v^\epsilon = -0.00181$ pm·MHz/με·° C.

Thus, by measuring the change of the BFS ($\delta v_B$) and the wavelength difference ($\delta(\Delta\lambda)$) between probe and pump (also referred to herein as the wavelength separation between the probe and pump lights), simultaneous measurement of strain and temperature variations can be achieved by solving the following equation:

$$\begin{bmatrix} \delta\varepsilon \\ \delta T \end{bmatrix} = \frac{1}{K_\lambda^\epsilon K_v^T - K_\lambda^T K_v^\epsilon} \begin{bmatrix} K_v^T & -K_\lambda^T \\ -K_v^\epsilon & K_\lambda^\epsilon \end{bmatrix} \begin{bmatrix} \delta(\Delta\lambda) \\ \delta v_B \end{bmatrix} \quad (21)$$

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

We claim:

1. A distributed Brillouin optical fiber sensing system, comprising:
   a sensing optical fiber that supports a fundamental guided mode and at least one higher-order guided mode;
   a pump light source that introduces pump light into one of the guided modes to define a pump light guided mode, the pump light forming a Brillouin dynamic grating (BDG);
   a probe light source that introduces input probe light into one or more of the guided modes other than the pump light guided mode to create reflected probe light from the BDG, with the reflected and input probe light shifted in frequency by a Brillouin frequency shift; and
   a receiver optically coupled to the sensing optical fiber and that detects the reflected probe light to determine a Brillouin frequency shift, a reflection location of the probe light, and the wavelength separation between the probe and pump lights, said receiver determining simultaneously temperature and strain in the sensing optical fiber as a function of distance along the sensing optical fiber.

2. The optical fiber sensing system according to claim 1, wherein the probe light source is wavelength tunable.

3. The optical fiber sensing system according to claim 1, wherein the pump light source comprises a continuous-wave (CW) light source or a pulsed light source.

4. The optical fiber sensing system according to claim 1, wherein the pump light has a wavelength in the range from 500 nm to 1600 nm.

5. The optical fiber sensing system according to claim 1, further comprising: the optical fiber having an input/output end, with the probe light reflection location being at a distance from the input/output end, the system having a spatial resolution of said distance of less than 1 meter and greater or equal to 1 centimeter.

6. The optical fiber sensing system according to claim 5, wherein the probe light has a pulse width of less than 10 ns.

7. The optical fiber sensing system according to claim 6, wherein the probe light pulse width is in the range from 0.1 ns to 5 ns.

8. The optical fiber sensing system according to claim 1, wherein the pump light source comprises a first pump light source of frequency v optically coupled to one end of the sending optical fiber, and a second pump light source of frequency $v - v_B$ optically coupled to the sensing optical fiber at an end opposite the first pump light source, so that the second pump light interacts with the first pump light to form the BDG.

9. A distributed Brillouin optical fiber sensing system, comprising:
   a sensing optical fiber configured to support at least first and second guided modes;
   a first pump light source optically coupled to the sensing optical fiber and that generates first pump light that travels in the sensing optical fiber in the first guided mode and forms a Brillouin dynamic grating (BDG) that contains information of a local Brillouin frequency of the sensing optical fiber;
   a probe light source optically coupled to the sensing optical fiber and that generates pulsed probe light that travels in the sensing optical fiber in the second guided mode, with the pulsed probe light having a wavelength selected so that at least a portion of the pulsed probe light reflects from the Brillouin dynamic grating and includes information about the local Brillouin frequency and a probe-light reflection location; and
   a receiver optically coupled to the sensing optical fiber and that receives the reflected probe light and determines the local Brillouin frequency, the reflection location, the wavelength separation between pump and probe lights, and at least two condition along the sensing optical fiber wherein the at least two conditions include at of temperature and strain as a function of distance from an input/output end of the sensing optical fiber.

10. The optical fiber sensing system according to claim 9, further comprising at least one of the following:
   (i) the first guided mode being a fundamental guided mode of the sensing optical fiber and the second guided mode being a higher-order guided mode of the sensing optical fiber;

(ii) sensing at least one condition of said two conditions with a spatial resolution $\Delta Z$ in the range 1 cm$\leqq\Delta Z<$1 m; and (iii) the pulsed probe light having a pulse width of less than 10 ns.

11. A method of sensing at least two conditions along a sensing optical fiber, comprising:

sending pump light down the optical fiber in only a first guided mode supported by the sensing optical fiber to create a Brillouin dynamic grating;

sending pulsed probe light of a first frequency down the optical fiber in at least a second guided mode supported by the sensing optical fiber to obtain reflected probe light from the Brillouin dynamic grating, the reflected probe light having a second frequency shifted relative to the first frequency by a frequency shift and having a reflection location; and analyzing the reflected probe light shifted frequency, the reflection location, and the wavelength separation between probe pump light to determine the at least two conditions.

12. The method according to claim 11, wherein at least two conditions include at temperature and strain.

13. The method according to claim 11, further comprising the probe signal having a pulse width of less than 10 ns.

14. The method according to claim 11, further comprising sensing at least one of said at least two conditions with a spatial resolution $\Delta Z$ in the range 1 cm$\leqq\Delta Z<$1 m.

15. The method according to claim 11, further comprising sending the pump light down the optical fiber in first and second counter-propagating directions to form the Brillouin dynamic grating.

16. The method according to claim 11, wherein the first guided mode is a fundamental mode of the sensing optical fiber.

17. A distributed Brillouin optical fiber sensing system, comprising:

a sensing optical fiber that supports a fundamental guided mode and at least one higher-order guided mode, said sensing fiber having core radius ro of 4 $\mu$m$\leqq$ro$\leqq$10 $\mu$m and F factor ($\mu$m$^2$) of 76 $\mu$m$^2$ to 306 $\mu$m$^2$;

a pump light source that introduces pump light into one of the guided modes to define a pump light guided mode, the pump light forming a Brillouin dynamic grating (BDG); and a probe light source that introduces input probe light into one or more of the guided modes other than the pump light guided mode to create reflected probe light from the BDG, with the reflected and input probe light shifted in frequency by a Brillouin wavelength shift.

18. The fiber of claim 17 wherein the core radius is 5 $\mu$m$\leqq$r$\leqq$7 $\mu$m and the core $\mu$ is between 0.4% to 0.7%.

* * * * *